(12) United States Patent
Okada et al.

(10) Patent No.: US 9,547,190 B2
(45) Date of Patent: Jan. 17, 2017

(54) COMPONENT MOUNTING APPARATUS

(71) Applicant: Panasonic Corporation, Osaka (JP)

(72) Inventors: Yasuhiro Okada, Yamanshi (JP);
Chihiro Igarashi, Yamanashi (JP);
Toshihiko Tsujikawa, Yamanashi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 176 days.

(21) Appl. No.: 14/471,469

(22) Filed: Aug. 28, 2014

(65) Prior Publication Data

US 2015/0083335 A1    Mar. 26, 2015

(30) Foreign Application Priority Data

Sep. 24, 2013  (JP) ................. 2013-196431

(51) Int. Cl.
*B29C 65/00* (2006.01)
*G02F 1/1333* (2006.01)

(52) U.S. Cl.
CPC .................. *G02F 1/133308* (2013.01)

(58) Field of Classification Search
CPC .. H01L 2224/838; H01L 24/27; Y10T 156/10;
Y10T 29/49826; Y10T 29/49004; Y10T
156/1084; Y10T 156/17; B29C 65/00;
B29C 47/0021; B29C 47/065; B29C
47/067; B29C 66/8322; B29C
66/43; B29C 55/20; G02F 1/133308

USPC ......................................... 156/366
See application file for complete search history.

(56) References Cited

U.S. PATENT DOCUMENTS

2015/0083336 A1*  3/2015 Okada ................. H01L 24/75
                                                         156/366

FOREIGN PATENT DOCUMENTS

JP       2012-227194 A    11/2012

OTHER PUBLICATIONS

Translation of JP 2012-227194, Japan, Published Nov. 15, 2012, Hitachi High-Technologies Corporation.*

* cited by examiner

*Primary Examiner* — George Koch
(74) *Attorney, Agent, or Firm* — Pearne & Gordon LLP

(57) ABSTRACT

A component mounting apparatus includes a tape attaching unit, a component mounting unit and a component compression unit provided in this order. A time measuring unit measures time having passed after attachment of the adhesive tape in the tape attaching unit. When a predetermined time has passed after the start of measurement performed by the time measuring unit, the substrate, to which the adhesive tape of a measuring target is attached, is forcibly transferred to the downstream side, and the component is compressed to the substrate in the component compression unit.

3 Claims, 19 Drawing Sheets

COMPONENT MOUNTING APPARATUS

CROSS REFERENCE TO RELATED APPLICATIONS

The present application is based on and claims the benefit of Japanese patent application No. 2013-196431 filed on Sep. 24, 2013, the contents of which are incorporated by reference in its entirety.

BACKGROUND OF THE INVENTION

1. Field of the Invention

The present invention relates to a component mounting apparatus that manufactures a mounting substrate by compressing a component mounted on a substrate with an adhesive tape interposed therebetween.

2. Description of the Related Art

A component mounting apparatus in which a tape attaching device, a temporary compression device, and a normal compression device are provided in this order from the upstream side is known as an component mounting apparatus that mounts a component on a substrate such as a liquid crystal panel with an adhesive tape such as an anisotropic conductive tape (ACF tape) interposed therebetween (for example, see JP-A-2012-227194). A feed apparatus, which feeds substrates, or the like is disposed on the upstream side of the component mounting apparatus, and a collecting apparatus, which collects mounting substrates, or the like is disposed on the downstream side of the component mounting apparatus. Further, conveyor members as substrate conveying mechanisms are disposed between the respective devices.

First, a substrate, which is conveyed to the component mounting apparatus from the upstream side, is transferred to the tape attaching device, and an adhesive tape is attached to the substrate. Then, the substrate is transferred to the temporary compression device and a component is temporarily compressed to (mounted on) the substrate with an adhesive tape interposed therebetween. After that, the substrate is transferred to the normal compression device, and the component is normally compressed to the substrate while being pressed by the compression tool. A mounting substrate is manufactured by the above-mentioned steps. The substrate, which has been subjected to normal compression, is carried to the downstream side from the component mounting apparatus.

From the standpoint of improving work tact, various kinds of work performed in the tape attaching device, the temporary compression device, and the normal compression device are simultaneously performed in parallel. Accordingly, the transfer of the substrate to the tape attaching device from an upstream apparatus, the transfer of the substrate to the temporary compression device from the tape attaching device, the transfer of the substrate to the normal compression device from the temporary compression device, and the transfer of the substrate to a downstream apparatus from the normal compression device are also simultaneously performed in parallel.

When preparation for transferring a substrate to the tape attaching device from the upstream apparatus is not completed due to a certain trouble under this transfer form, the substrate having been completely subjected to work in each downstream apparatus waits for transfer. In this case, the adhesion of the adhesive tape, which is attached to the substrate in the tape attaching device, deteriorates as time passes. For this reason, even though a component is normally compressed to the substrate after waiting for transfer is cancelled, a mounting defect caused by the lack of adhesion may be generated. In an example disclosed in JP-A-2012-227194, as one solution to this problem, time which has passed after the attachment of the adhesive tape to the substrate is recognized, but when a predetermined time has passed before the normal compression it is determined that the adhesive tape is deteriorated, and the adhesive tape and the components (mounting members) are peeled off from the substrate, thereby reusing the substrate.

SUMMARY OF THE INVENTION

However, according to the related art, it is possible to prevent the normal compression of the component, which is performed on the substrate to which the deteriorated adhesive tape is attached, but the following problems have been generated. That is, much time and effort have been required to peel the adhesive tape and the components for the reuse of the substrate, and the adhesive tape and the components have been wasted. Moreover, since it is difficult to peel a certain adhesive tape, there also is a problem in that the substrate should be discarded when the adhesive tape cannot be peeled so that the substrate can be reused.

Accordingly, one non-limited object of the present invention is to provide a component mounting apparatus that can compress a component to a substrate while suppressing the deterioration of an adhesive tape.

An aspect of the present invention provides a component mounting apparatus including: a tape attaching unit that attaches an adhesive tape to a substrate; a component mounting unit that is provided on a downstream side of the tape attaching unit and mounts a component on the adhesive tape attached to the substrate; a component compression unit that is provided on a downstream side of the component mounting unit and compresses the component, which is mounted on the substrate, to the substrate with the adhesive tape interposed therebetween; a first substrate transfer unit that transfers the substrate, to which the adhesive tape is attached, to the component mounting unit from the tape attaching unit; a second substrate transfer unit that transfers the substrate, on which the component is mounted, to the component compression unit from the component mounting unit; and a time measuring unit that measures time having passed after attachment of the adhesive tape in the tape attaching unit, wherein when a predetermined time has passed after the start of measurement performed by the time measuring unit, the substrate, to which the adhesive tape of a measuring target is attached, is forcibly transferred to the downstream side, and the component compression unit compresses the component to the substrate forcibly transferred to the component compression unit.

In the component mounting apparatus, the component compression unit may compress the component before deterioration of the adhesive tape attached to the substrate forcibly transferred to the downstream side from the tape attaching unit.

In the component mounting apparatus, the predetermined time may include a first allowed time being set for a first substrate remaining in the tape attaching unit, and a second allowed time being set for a second substrate remaining in the component mounting unit to forcibly transfer the first and second substrates by the first and second substrate transfer units to their downstream sides, respectively, wherein the first allowed time is shorter than the second allowed time.

According to some aspects of the present invention, when a predetermined time has passed after the start of measurement performed by the time measuring unit, the substrate, to which the adhesive tape of a measuring target is attached, is forcibly transferred to the downstream side and the component is compressed to the substrate forcibly transferred to the component compression unit. Accordingly, it is possible to compress the component while suppressing the deterioration of the adhesive tape.

DETAILED DESCRIPTION OF THE EXEMPLARY EMBODIMENTS

The entire structure of a component mounting apparatus of the present invention will be described first with reference to FIG. 1. The component mounting apparatus 1 has a function of manufacturing a mounting substrate by compressing an electronic component (hereinafter, simply referred to as a "component") mounted on a substrate with an ACF tape interposed therebetween. The ACF tape is obtained by forming an anisotropic conductive film, which is a type of an adhesive tape, in the shape of a tape. Examples of the component include a drive circuit component that has a film-shaped portion.

Figure 1:
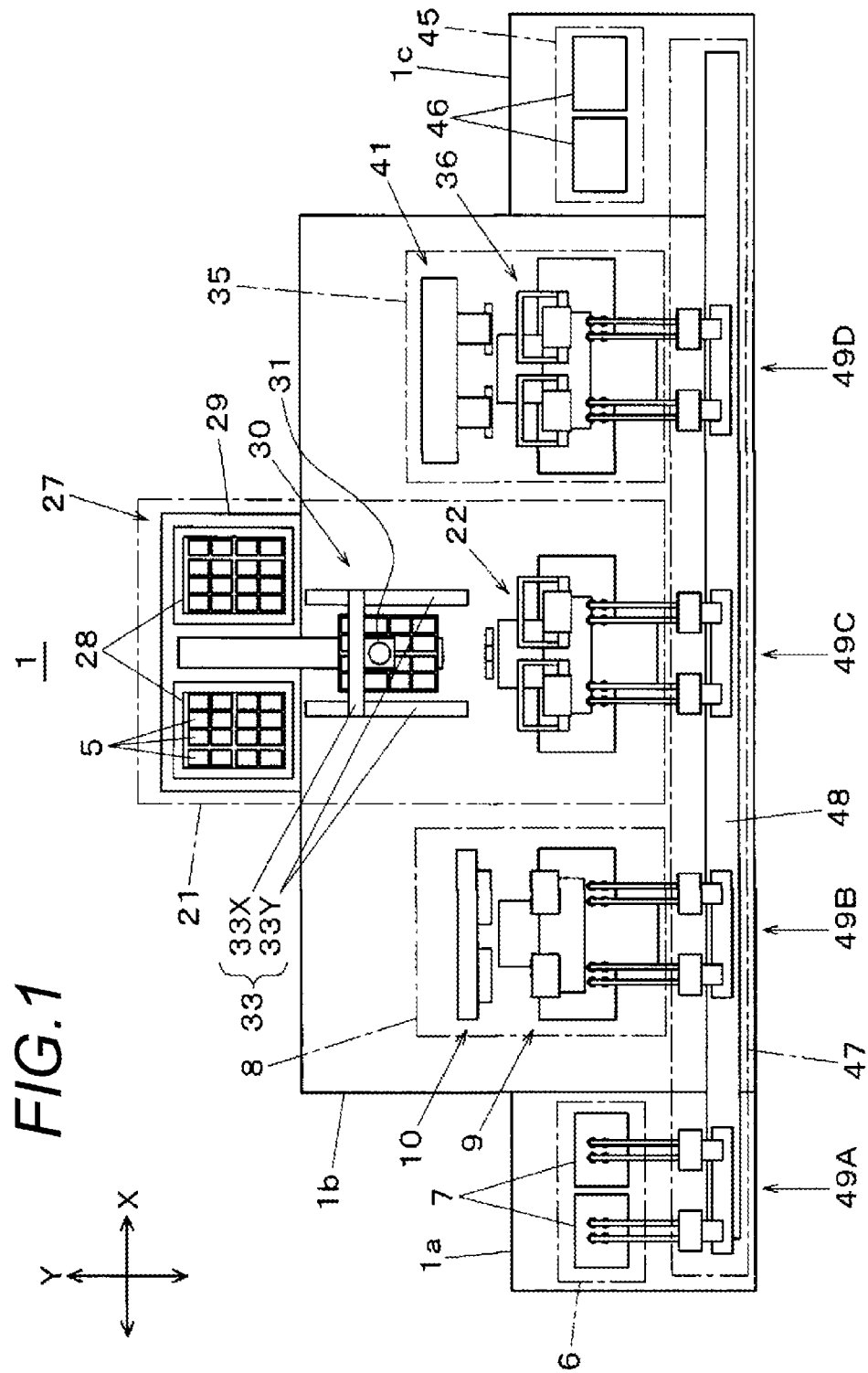
FIG. 1 is a plan view of a component mounting apparatus according to an embodiment of the present invention.

In FIG. 1, the component mounting apparatus 1 has a structure in which bases 1a, 1b, and 1c are arranged in one direction (X direction) on a horizontal plane, a substrate carrying-in unit 6 as a work unit is disposed on the base 1a, a tape attaching unit 8, a component mounting unit 21, and a component compression unit 35 as work units are disposed on the base 1b, a substrate carrying-out unit 45 as a work unit is disposed on the base 1c, and a substrate transfer mechanism 47 is disposed in an area in front of each work unit. Hereinafter, the side on which the substrate carrying-in unit 6 is disposed is referred to as an upstream side (the left side on the plane of paper) and the side on which the substrate carrying-out unit 45 is disposed is referred to as a downstream side (on the right side on the plane of paper). Further, a direction orthogonal to an X direction in a horizontal plane is referred to as a Y direction, and a direction perpendicular to an X-Y plane is referred to as a Z direction. Furthermore, among the above-mentioned five work units, the tape attaching unit 8, the component mounting unit 21, and the component compression unit 35 are referred to as "mounting work units".

In FIG. 1, the substrate carrying-in unit 6 is a work unit carrying in substrates 2 (FIGS. 2A and 2B) having been completely subjected to predetermined work by upstream facilities that are disposed on the upstream side of the component mounting apparatus 1. The substrate carrying-in unit 6 includes a plurality of (here, two) substrate holding tables 7. The plurality of substrate holding tables 7 are provided in parallel in the X direction, and are individually moved up and down relative to the base 1a by a table lift mechanism. The substrates 2, which are transferred from the upstream facility, are placed on the substrate holding tables 7 by upstream facility-transfer means, such as a transfer arm, included in the upstream facility.

In FIGS. 1 to 3C, the tape attaching unit 8 is a mounting work unit attaching an individual tape 4b1, which is obtained by cutting an ACF tape 4b (FIGS. 3A to 3C) into a predetermined length, to the substrate 2. The tape attaching unit 8 is provided at the upstream portion of the base 1b, and includes a substrate positioning mechanism 9 and an attaching mechanism 10 that is provided above the substrate positioning mechanism 9.

Figure 2A:
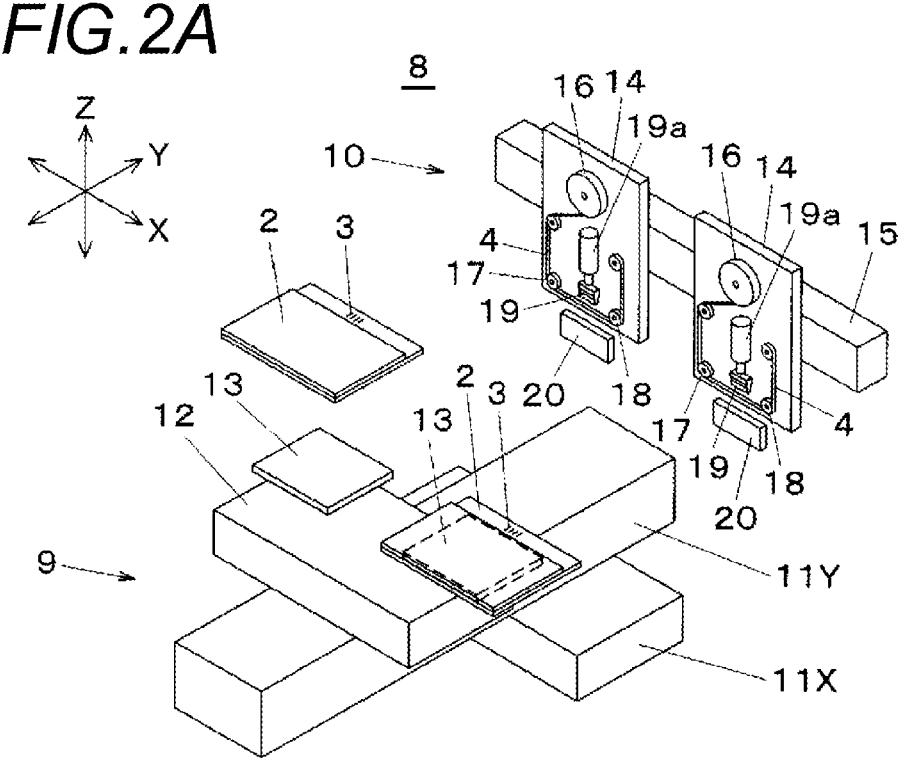
FIGS. 2A and 2B are perspective views of a tape attaching unit that is included in the component mounting apparatus according to the embodiment of the present invention.
Figure 2B:
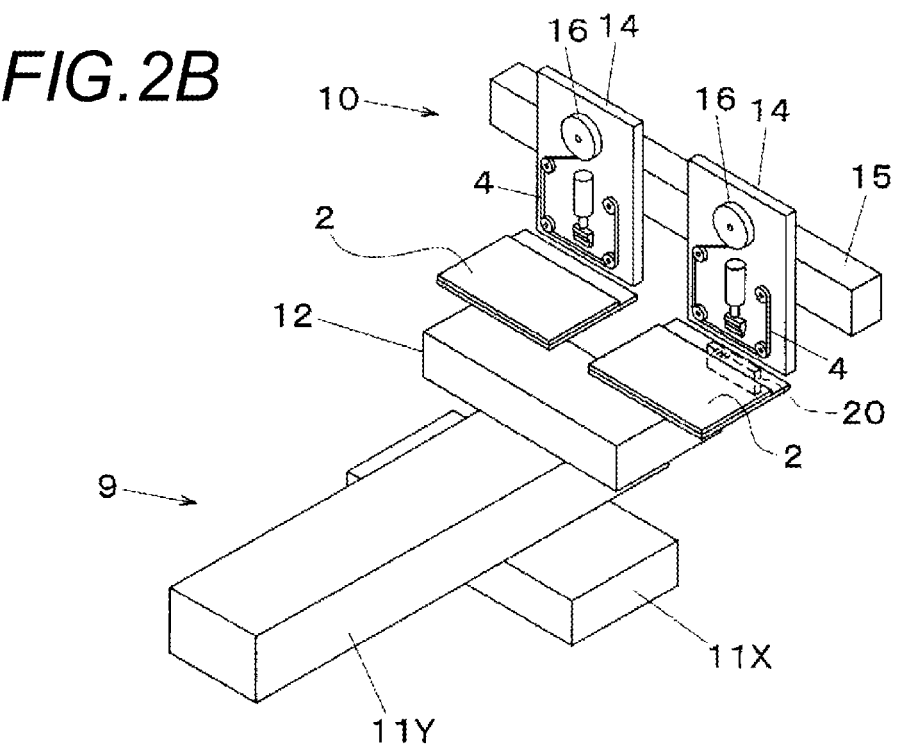

In FIGS. 2A and 2B, the substrate positioning mechanism 9 has a structure in which an X-axis table 11X and a Y-axis table 11Y are stacked and a moving stage 12 is provided on the Y-axis table 11Y. The Y-axis table 11Y is moved in the X direction by the driving of the X-axis table 11X. Further, the moving stage 12 is moved in the Y direction by the driving of the Y-axis table 11Y.

A plurality of (here, two) substrate holding tables 13 are provided on the moving stage 12 in parallel in the X direction, and hold the substrates 2 that are transferred from the substrate carrying-in unit 6. The respective substrate holding tables 13 are individually moved up and down relative to the moving stage 12 by the driving of the table lift mechanism. It is possible to move the substrates 2, which are held by the substrate holding tables 13, in the X direction, the Y direction, and the Z direction and to position the substrates 2 at predetermined positions by driving the X-axis table 11X, the Y-axis table 11Y, and the table lift mechanism.

The attaching mechanism 10 includes a plurality of (here, two) base plates 14 that are provided in parallel in the X direction. A plate moving mechanism 15, which extends in the X direction, is mounted on the rear surfaces of the respective base plates 14, and the respective base plates 14 are individually moved in the X direction by the driving of the plate moving mechanism 15.

Figure 3A:
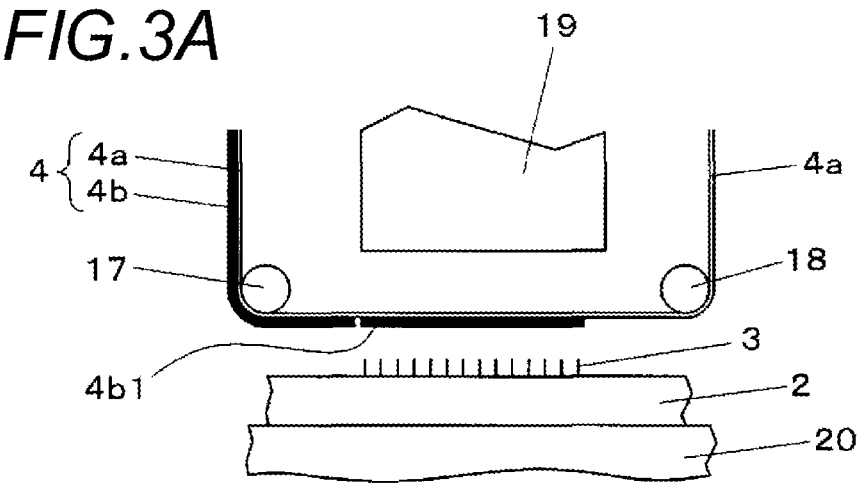
FIGS. 3A, 3B, and 3C illustrate tape attaching work according to the embodiment of the present invention.
Figure 3B:
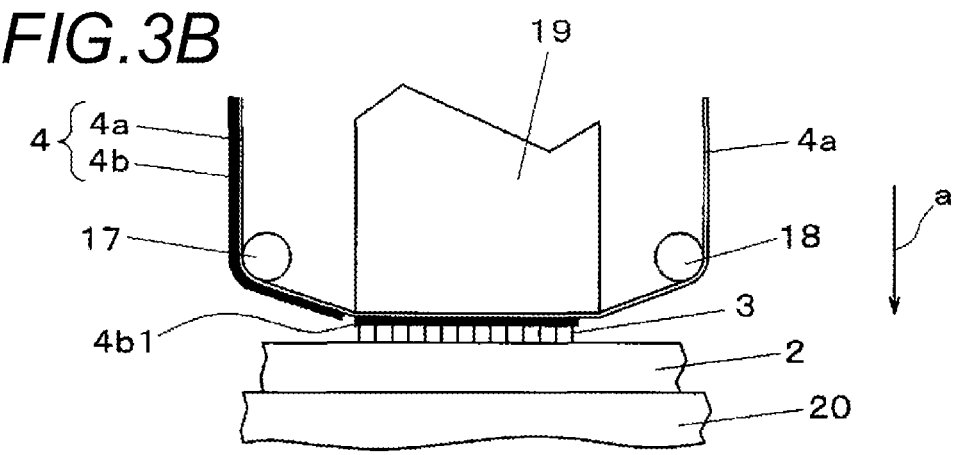
Figure 3C:
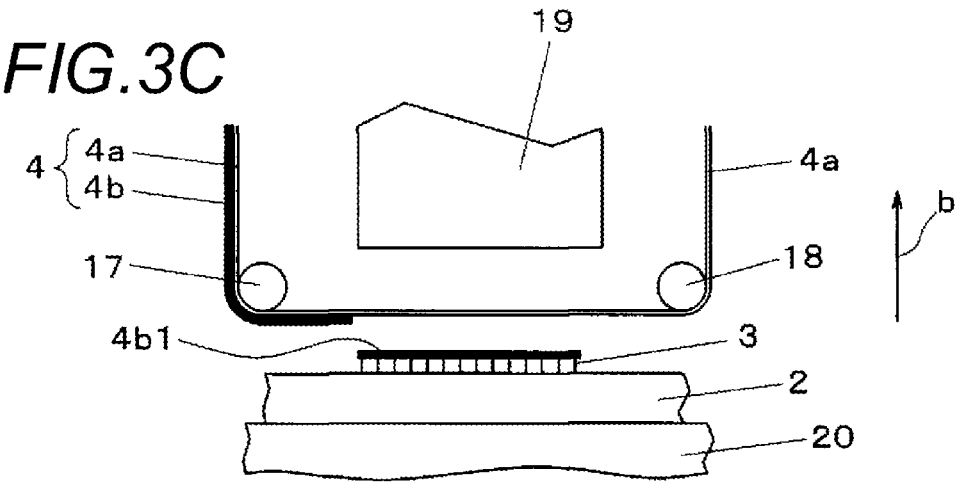

A tape feed reel 16 is detachably mounted at an upper position on the front surface of each of the base plates 14. A tape member 4 in which the ACF tape 4b is laminated on a separator 4a is wound and stored on the tape feed reel 16 as shown in FIGS. 3A to 3C, and the tape feed reel 16 is rotationally driven by a reel driving mechanism.

In FIGS. 2A to 3C, a first guide roller 17 and a second guide roller 18 are disposed at horizontal positions on both side portions of a lower end portion of the base plate 14. The tape member 4 surrounds the first guide roller 17 and is horizontally guided from the upstream side toward the downstream side while the ACF tape 4b faces the lower side.

A compression tool 19, which is moved up and down by a tool lift mechanism 19a, is provided above a horizontal feed path for the tape member 4 between the two guide rollers 17 and 18. A cutter unit, which cuts the ACF tape 4b according to the length of an electrode portion 3 of the substrate 2, is provided at a position on the upstream side of the compression tool 19. The individual tape 4b1, which is cut into a predetermined length by the cutter unit, is fed below the compression tool 19. The tape member 4 of which only the separator 4a remains after the individual tape 4b1 is attached to the substrate 2 surrounds the second guide roller 18, is guided to the upper side, and is collected in a tape collecting unit.

In FIGS. 2A to 3C, a backup stage 20, which has a horizontal surface extending in the X direction, is provided below the compression tool 19. The backup stage 20 supports an edge portion of the substrate 2, at which the electrode portion 3 is formed, from below.

In tape attaching work, first, as shown in FIG. 2B, the substrate positioning mechanism 9 is driven to move the moving stage 12 in a predetermined direction so that edge portions of the substrates 2 held by the plurality of substrate holding tables 13 are positioned above the backup stages 20. After that, as shown in FIGS. 3A and 3B, the compression tool 19 is moved down (arrow a) while the individual tape 4b1 is positioned above the electrode portion 3 of the substrate 2. Accordingly, the individual tape 4b1 is pressed against and attached to the electrode portion 3. After the individual tape 4b1 is attached, the compression tool 19 is moved up as shown in FIG. 3C (arrow b). Meanwhile, the plate moving mechanism 15 may be driven to move the base plate 14 in the X direction, so that the substrate 2 and the compression tool 19 may be positioned.

Figure 4A:
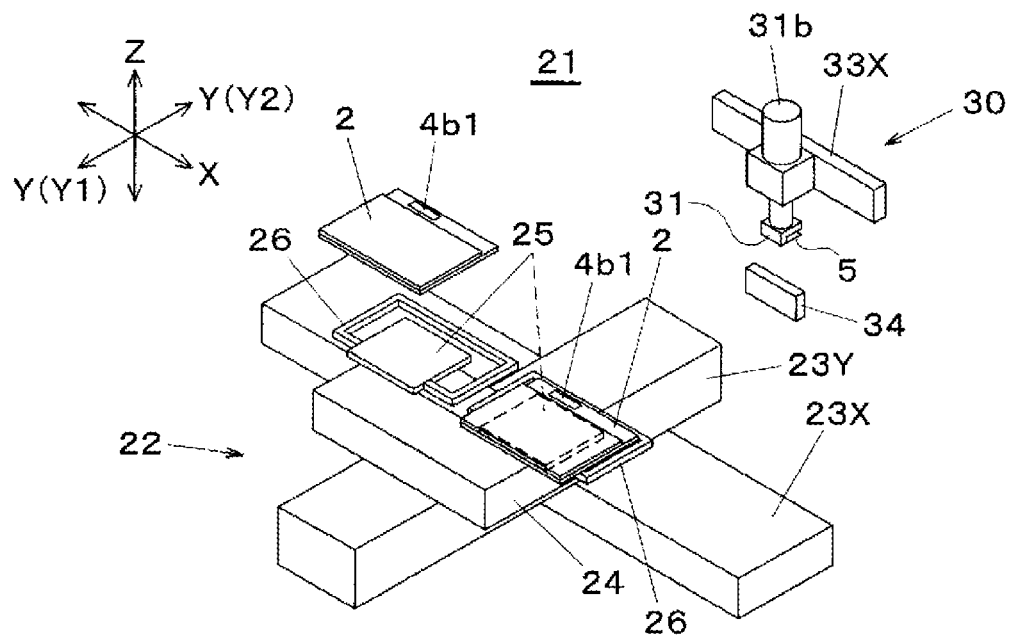
FIGS. 4A and 4B are perspective views of a component mounting unit that is included in the component mounting apparatus according to the embodiment of the present invention.
Figure 4B:
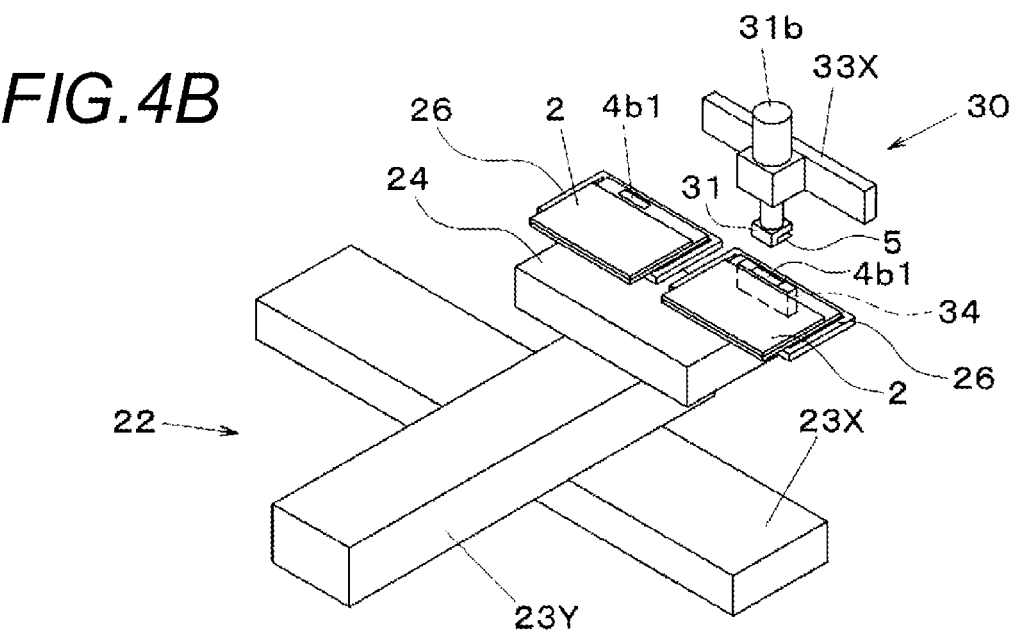

In FIG. 1 and FIGS. 4A and 4B, the component mounting unit 21 is a mounting work unit that is provided on the downstream side of the tape attaching unit 8 and mounts a component 5 on the individual tape 4b1 attached to the substrate 2. The component mounting unit 21 includes a substrate positioning mechanism 22, a component feed mechanism 27 that is provided on the rear side of the substrate positioning mechanism 22, and a component mounting mechanism 30 that is provided between the substrate positioning mechanism 22 and the component feed mechanism 27.

In FIGS. 4A and 4B, similar to the substrate positioning mechanism 9, the substrate positioning mechanism 22 has a structure in which an X-axis table 23X and a Y-axis table 23Y are stacked and a moving stage 24 is provided on the upper surface of the Y-axis table 23Y. A plurality of (here, two) substrate holding tables 25 are provided on the upper surface of the moving stage 24 in parallel in the X direction, and hold the substrates 2 that are transferred from the tape attaching unit 8. The respective substrate holding tables 25 are individually moved up and down relative to the moving stage 24 by a stage lift mechanism. It is possible to move the substrates 2, which are held by the substrate holding tables 25, in the X direction, the Y direction, and the Z direction and to position the substrates 2 at predetermined positions by driving the X-axis table 23X, the Y-axis table 23Y, and the stage lift mechanism.

In FIGS. 4A to 5C, the substrate holding table 25 is provided with a frame-like member 26 that includes a contact portion 26a extending in the X direction on the rear side of the substrate holding table 25 (Y2 side). The frame-like member 26 supports a film-shaped portion 5a from below while the film-shaped portion 5a comes into contact with the contact portion 26a when a component is mounted. Accordingly, the sag of the film-shaped portion 5a is prevented.

In FIG. 1, the component feed mechanism 27 includes a tray holder 29 in which trays 28 storing a plurality of components 5 are stacked and which holds the trays 28. One tray, which is held by the tray holder 29, is taken out of the tray holder 29 by a tray transfer mechanism, and is transferred to a predetermined component feed position.

Figure 5A:
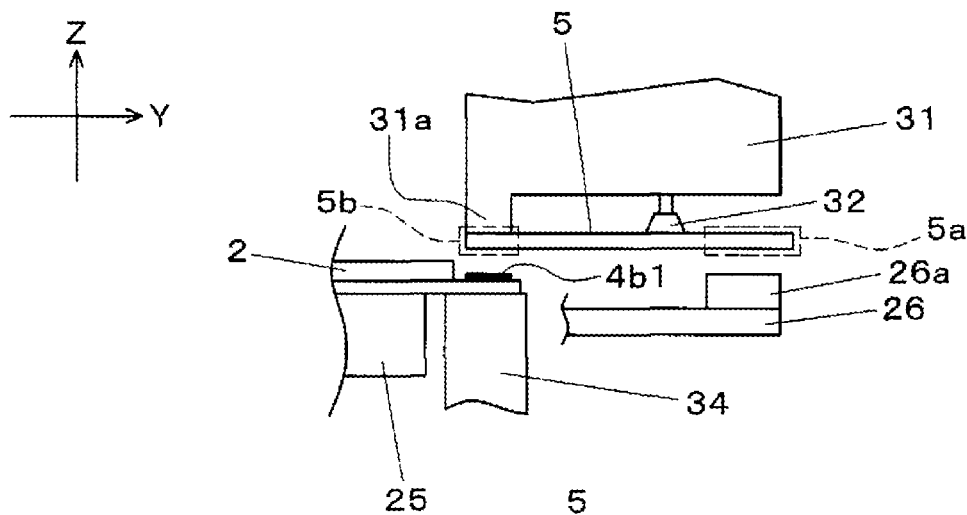
FIGS. 5A, 5B, and 5C illustrate component mounting work of the embodiment of the present invention.
Figure 5B:
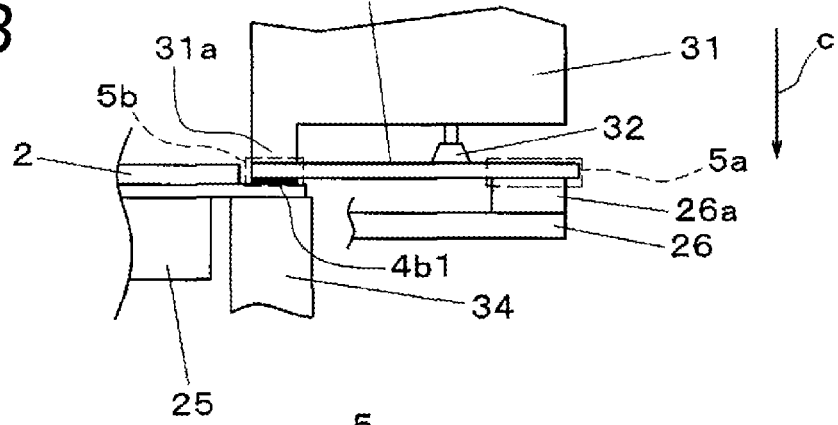
Figure 5C:
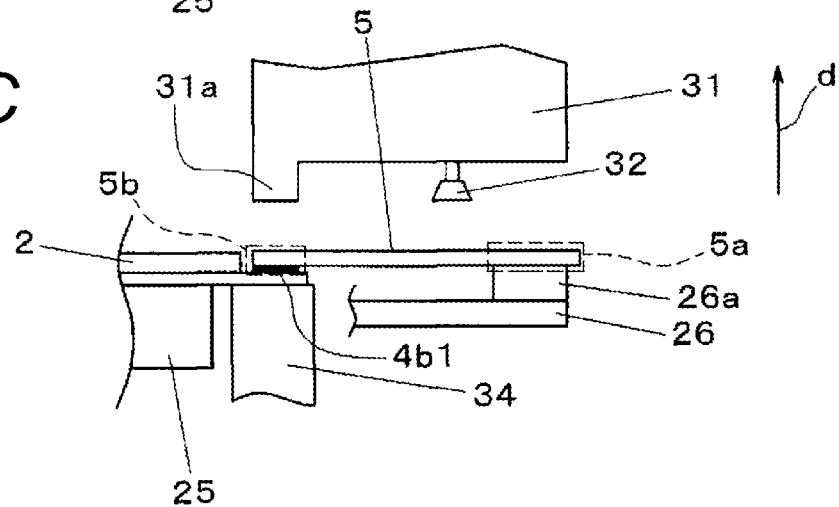

In FIGS. 1, 4A, and 4B, the component mounting mechanism 30 includes a mounting head 31 and a head moving mechanism 33. In FIGS. 5A to 5C, a contact portion 31a with which a connection portion 5b of the component 5 to be connected to the electrode portion 3 with the individual tape 4b1 interposed therebetween comes into contact and a suction nozzle 32 having a suction surface, which is set to the same height as the height of the lower surface of the contact portion 31a, are provided on the lower surface of the mounting head 31. The mounting head 31 is moved up and down by a head lift mechanism 31b, and sucks and holds the component 5 by the suction nozzle 32 while the connection portion 5b of the component 5 comes into contact with the contact portion 31a.

In FIG. 1, the head moving mechanism 33 is to move the mounting head 31 in the X direction and the Y direction and includes two Y-axis tables 33Y and an X-axis table 33X that is installed on the Y-axis tables 33Y and is movable in the Y direction. The mounting head 31 is mounted on the X-axis table 33X so as to be movable in the X direction, and is moved in the X direction and the Y direction above the tray 28, which is transferred to the component feed position, by the driving of the Y-axis tables 33Y and the X-axis table 33X.

In FIGS. 4A and 4B, a backup stage 34 having a horizontal surface is provided at a predetermined position in a moving area of the mounting head 31 on the rear side of the substrate positioning mechanism 22. The backup stage 34 supports an edge portion, to which the individual tape 4b1 is attached, of the substrate 2 from below.

In component mounting work, first, as shown in FIG. 4B, the substrate positioning mechanism 22 is driven to move the moving stage 24 in a predetermined direction so that an edge portion of the substrate 2 held by each substrate holding table 25 is positioned above the backup stage 34. After that, one tray 28 is transferred to a component feed position and the mounting head 31 is moved to a position above the tray 28. Then, after a component 5 is taken out of the tray 28 by the mounting head 31, the contact portion 31a is positioned above the electrode portion 3, to which the individual tape 4b1 is attached, of one positioned substrate 2 as shown in FIG. 5A.

After that, as shown in FIG. 5B, the mounting head 31 is moved down (arrow c) and the component 5 is mounted on the substrate 2 with the individual tape 4b1 interposed therebetween. At this time, the film-shaped portion 5a of the component 5 is supported from below by the contact portion 26a of the frame-like member 26. Then, when the mounting head 31 is moved up (arrow d) as shown in FIG. 5C, the component mounting work performed on one substrate 2 is ended. Further, the mounting head 31 is moved to a position above the tray 28 again, takes out a component 5, and mounts the component 5 on another substrate 2.

Figure 6A:
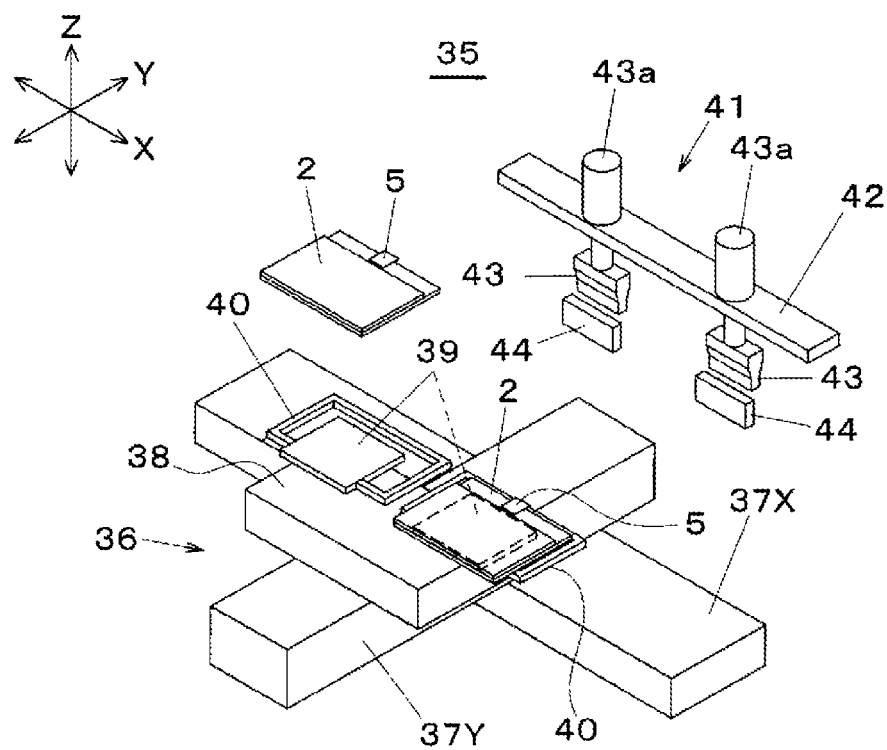
FIGS. 6A and 6B are perspective views of a component compression unit that is included in the component mounting apparatus according to the embodiment of the present invention.
Figure 6B:
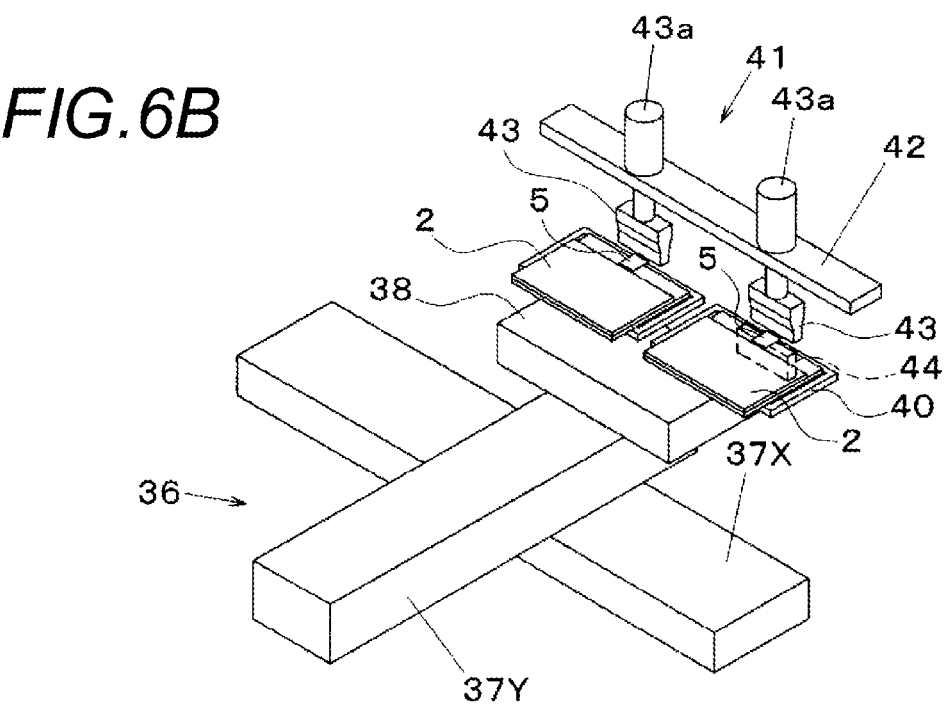

In FIGS. 1, 6A, and 6B, the component compression unit 35 is a mounting work unit that is provided on the downstream side of the component mounting unit 21 and compresses the component 5 mounted on the substrate 2. The component compression unit 35 includes a substrate positioning mechanism 36 and a compression mechanism 41 that is provided above the substrate positioning mechanism 36.

In FIGS. 6A and 6B, similar to the substrate positioning mechanisms 9 and 22, the substrate positioning mechanism 36 has a structure in which an X-axis table 37X and a Y-axis table 37Y are stacked and a moving stage 38 is provided on the Y-axis table 37Y. A plurality of (here, two) substrate holding tables 39 are provided on the upper surface of the moving stage 38 in parallel in the X direction, and hold the substrates 2 that are transferred from the component mounting unit 21. The respective substrate holding tables 39 are individually moved up and down relative to the moving stage 38 by a table lift mechanism. It is possible to move the substrates 2, which are held by the substrate holding tables 39, in the X direction, the Y direction, and the Z direction by driving the X-axis table 37X, the Y-axis table 37Y, and the table lift mechanism.

In FIGS. 6A to 7C, the substrate holding table 39 is provided with a frame-like member 40 that includes a contact portion 40a extending in the X direction on the rear side of the substrate holding table 39. The frame-like member 40 supports the film-shaped portion 5a from below while the film-shaped portion 5a comes into contact with the contact portion 40a when the substrate 2 is held by the substrate holding table 39.

The compression mechanism 41 has a structure in which a plurality of (here, two) compression tools 43 are provided below a plate member 42 extending in the X direction so as to be movable up and down. Tool lift mechanisms 43a are mounted on the upper surface of the plate member 42, and the compression tools 43 are moved up and down by the driving of the tool lift mechanisms 43a. Backup stages 44 having horizontal surfaces are provided at positions below the compression tools 43. The backup stage 44 supports an edge portion, on which the component 5 is mounted, of the substrate 2 from below.

Figure 7A:
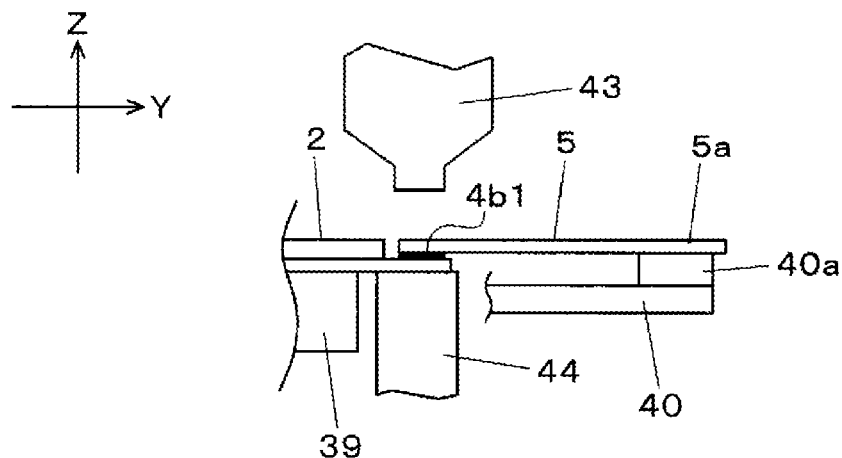
FIGS. 7A, 7B, and 7C illustrate component compression work of the embodiment of the present invention.
Figure 7B:
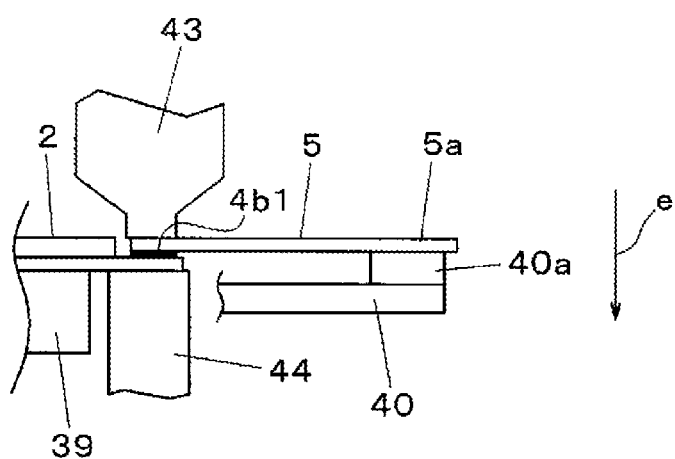
Figure 7C:
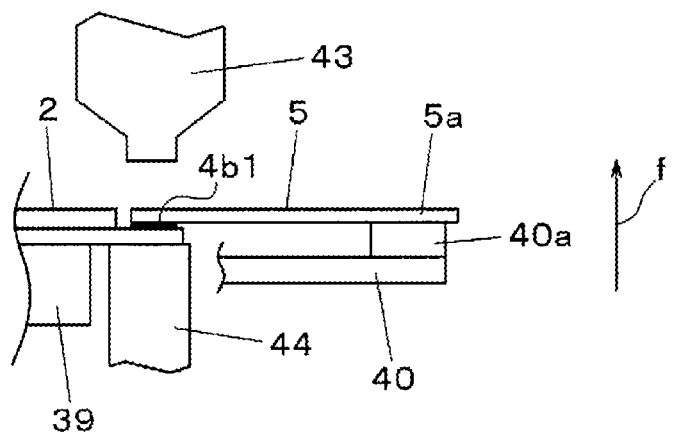

In component compression work, first, as shown in FIG. 6B, the substrate positioning mechanism 36 is driven to move the moving stage 38 in a predetermined direction so that edge portions of the substrates 2 held by the respective substrate holding tables 39 are positioned above the backup stages 44. After that, as shown in FIGS. 7A and 7B, the compression tool 43 is moved down (arrow e) from above the component 5 mounted on the substrate 2 and compresses the component 5 to the substrate 2. Meanwhile, the respective compression tools 43 may be simultaneously moved down onto two substrates 2, and may be continuously moved down. After pressing and bonding the component 5, the compression tool 43 is moved up (arrow f) as shown in FIG. 7C.

In FIG. 1, the substrate carrying-out unit 45 is a work unit carrying out substrates 2, which have been completely subjected to the component compression work by the component compression unit 35, from the component mounting apparatus 1. The substrate carrying-out unit 45 includes a plurality of (here, two) substrate holding tables 46. The respective substrate holding tables 46 are provided in parallel in the X direction, and are individually moved up and down relative to the base 1c by a table lift mechanism. The substrates 2, which are transferred from the component compression unit 35, are placed on the substrate holding table 46. Substrates 2 placed on the substrate holding tables 46 are carried to a downstream facility by downstream facility-transfer means, such as a transfer arm, included in the downstream facility provided on the downstream of the component mounting apparatus 1.

Figure 8:
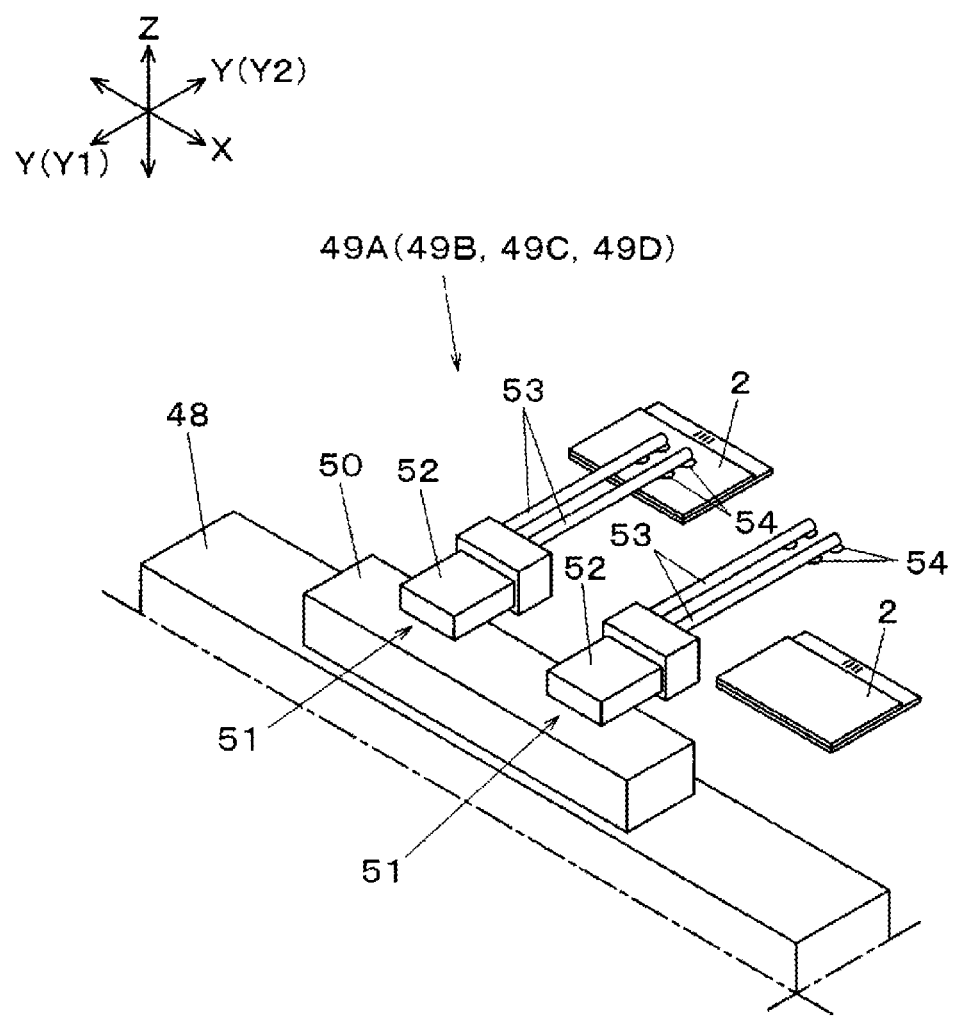
FIG. 8 is a partial perspective view of a substrate transfer unit that is included in the component mounting apparatus according to the embodiment of the present invention.

In FIGS. 1 and 8, the substrate transfer mechanism 47 is a transfer work unit that transfers (delivers) the substrate 2 between the work units, and includes an X-axis table 48 that extends in the X direction over the front area of the bases 1a, 1b, and 1c. A first substrate transfer mechanism 49A, a second substrate transfer mechanism 49B, a third substrate transfer mechanism 49C, and a fourth substrate transfer mechanism 49D are provided on the X-axis table 48 in this order from the upstream side. These substrate transfer mechanisms 49A to 49D are moved in the X direction in synchronization with each other by the driving of the X-axis table 48.

In FIG. 8, each of the substrate transfer mechanisms 49A to 49D includes a base part 50 that is mounted on the X-axis table 48 so as to be movable in the X direction and a plurality of (here, two) arm units 51 that are provided on the base part 50 in parallel in the X direction. Each of the arm units 51 includes an arm base 52 that is fixed to the base part 50 and a pair of arms 53 that extends rearward from the arm base 52. Since the arms 53 are provided with a plurality of suction pads 54 of which suction surfaces face the lower side (one arm 53 is provided with two suction pads 54), each of the arm units sucks and holds the substrate 2 by a total of four suction pads 54 of the pair of arms 53.

Figure 9:
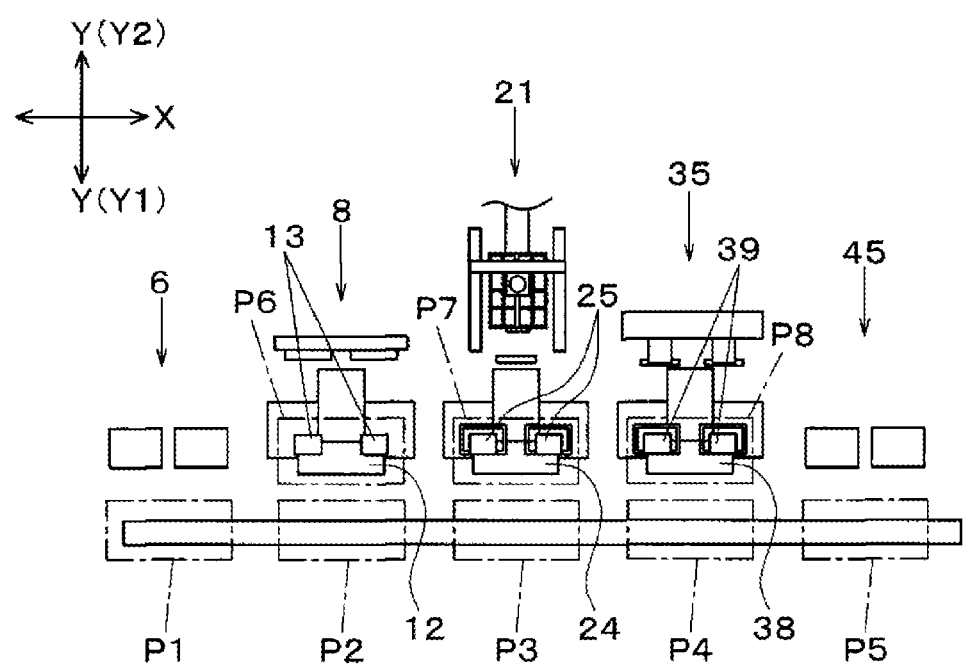
FIG. 9 is a plan view of the component mounting apparatus according to the embodiment of the present invention.

In FIG. 9, the first substrate transfer mechanism 49A is moved between a first position P1 that is present on the front side of the substrate carrying-in unit 6 (Y1 side) and a second position P2 that is present on the front side of the tape attaching unit 8. The second substrate transfer mechanism 49B is moved between the second position P2 and a third position P3 that is present on the front side of the component mounting unit 21. The third substrate transfer mechanism 49C is moved between the third position P3 and a fourth position P4 that is present on the front side of the component compression unit 35. The fourth substrate transfer mechanism 49D is moved between the fourth position P4 and a fifth position P5 that is present on the front side of the substrate carrying-out unit 45.

When the substrates 2 are transferred by the mounting work units, the moving stages 12, 24, and 38 are moved in the Y1 direction and the substrates 2 are positioned at a sixth position P6, a seventh position P7, and an eighth position P8 where the substrates 2 can be transferred on the substrate holding tables 13, 25, and 39 by the arms 53. Each of the sixth position P6, the seventh position P7, and the eighth position P8 is a substrate transfer position where the transfer of the substrates 2 is performed between the adjacent work units.

Figure 10A:
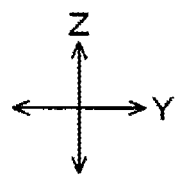
FIGS. 10A, 10B, and 10C illustrate substrate transfer work of the embodiment of the present invention.
Figure 10A:
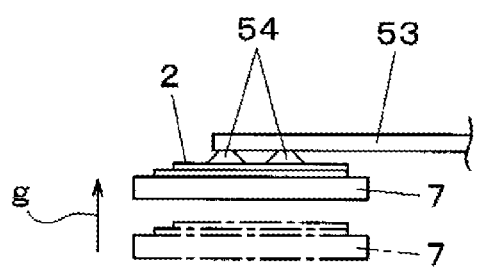
Figure 10B:
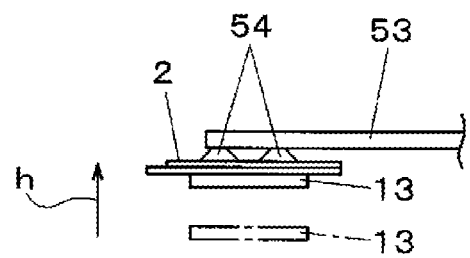
Figure 10C:
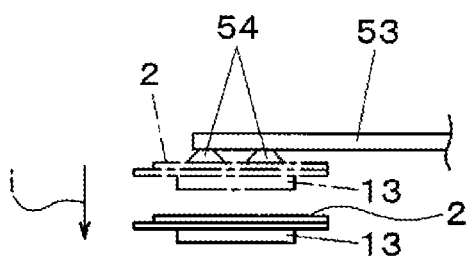

Next, transfer work for the substrate 2, which is performed between the work units, will be described with reference to FIGS. 10A, 10B, and 10C. Here, the transfer of the substrates 2 between the substrate carrying-in unit 6 and the tape attaching unit 8 will be described by way of example. First, as shown in FIG. 10A, the substrate holding tables 7, which hold the substrate 2, are moved up (arrow g) and the substrates 2 come into contact with the suction pads 54 of the arms 53 of the first substrate transfer mechanism 49A moved to the first position P1. Then, after the substrates 2 are sucked by the suction pads 54, the substrate holding tables 7 are moved down and the first substrate transfer mechanism 49A is moved to the second position P2 in such a state. After that, as shown in FIG. 10B, the substrate holding tables 13 provided on the moving stage 12 moved to the sixth position P6 are moved up (arrow h) and come into contact with the substrates 2 that are sucked by the suction pads 54. Then, after the suction caused by the suction pads 54 is cancelled, the substrate holding tables 13 are moved down as shown in FIG. 10C (arrow i). The transfer of the substrates 2 between the other work units is also performed by the same method.

Figure 11:
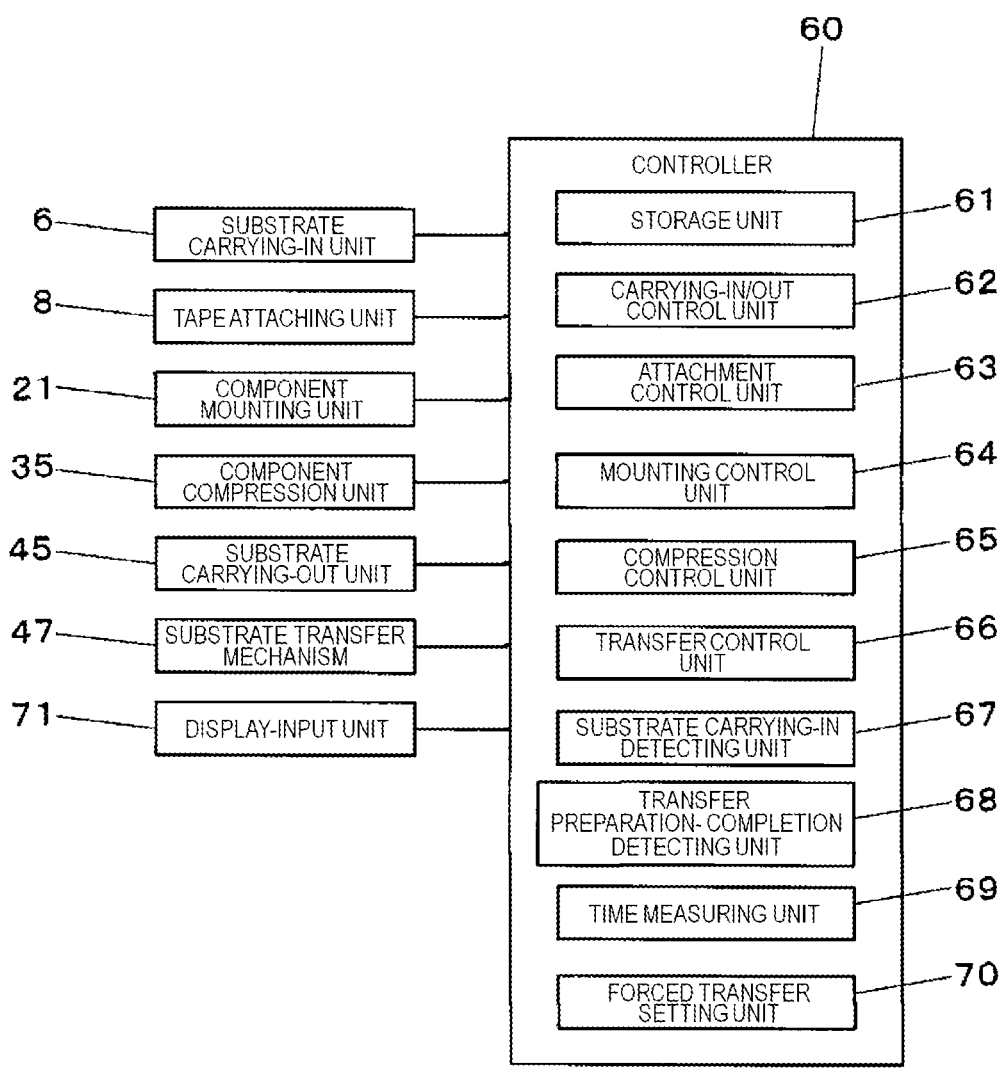
FIG. 11 is a block diagram showing the configuration of a control system for the component mounting apparatus according to the embodiment of the present invention.

Next, the configuration of the control system for the component mounting apparatus 1 will be described with reference to FIG. 11. A controller 60 included in the component mounting apparatus 1 has an arithmetic processing function, and includes a storage unit 61 a carrying-in/out control unit 62, an attachment control unit 63, a mounting control unit 64, a compression control unit 65, a transfer control unit 66, a substrate carrying-in detecting unit 67, a transfer preparation-completion detecting unit 68, a time measuring unit 69, and a forced transfer setting unit 70. Further, the controller 60 is connected to the substrate carrying-in unit 6, the tape attaching unit 8, the component mounting unit 21, the component compression unit 35, the substrate carrying-out unit 45, the substrate transfer mechanism 47, and a display-input unit 71.

The storage unit 61 stores an execution program for performing predetermined works on the substrates 2 in the respective work units, and also stores information on a substrate (hereinafter, referred to as "uncompressed substrate"), to which the individual tape 4b1 has been already attached, but the component 5 is not compressed, as a target of forcibly transfer.

The carrying-in/out control unit 62 allows the substrate holding tables 7 of the substrate carrying-in unit 6 and the substrate holding tables 46 of the substrate carrying-out unit 45 to be moved up and down by controlling the table lift mechanisms. The attachment control unit 63 performs the tape attaching work by controlling the respective mechanisms of the tape attaching unit 8. The mounting control unit 64 performs the component mounting work by controlling the respective mechanisms of the component mounting unit 21. The compression control unit 65 performs the component compression work by controlling the respective mechanisms of the component compression unit 35. Meanwhile, pieces of predetermined work of the respective mounting work units are simultaneously performed in parallel.

The transfer control unit 66 performs the transfer of the substrates 2 between the work units by controlling the respective mechanisms of the substrate transfer mechanism 47. The transfer control unit 66 transfers the substrates 2 in compliance with any one of a "normal transfer mode" and a "forced transfer mode" according to a setting state of forced transfer, a work state, or the like. Details of the forced transfer and the respective transfer modes will be described below.

The substrate carrying-in detecting unit 67 detects whether or not the substrates 2 are carried into the substrate carrying-in unit 6. The detection performed here is performed on the basis of various methods, such as the up and down movement of the substrate holding tables 7, a signal that is sent from an upstream facility when the substrates 2 are carried from the upstream facility, and a result of the detection of the substrates 2 that is performed by substrate detecting means such as a pressure sensor built in the substrate holding table 7. When the carrying-in of the substrates 2 is detected by the substrate carrying-in detecting unit 67, the transfer control unit 66 determines that preparation for transferring the substrates 2 to the tape attaching unit 8 is completed in the substrate carrying-in unit 6.

The transfer preparation-completion detecting unit 68 detects a "transfer preparation completion timing" at which preparation for transferring the substrates 2 to the downstream side is completed in each mounting work unit. That is, the transfer preparation-completion detecting unit 67 detects a timing, at which the moving stage 12 is positioned at the sixth position P6 after the individual tape 4b1 is attached to the substrate 2, as the transfer preparation completion timing in the tape attaching unit 8; detects a timing, at which the moving stage 24 is positioned at the seventh position P7 after the component 5 is mounted on the substrate 2, as the transfer preparation completion timing in the component mounting unit 21; and detects a timing, at which the moving stage 38 is positioned at the eighth position P8 after the component 5 is compressed to the substrate 2, as the transfer preparation completion timing in the component compression unit 35. As described above, the transfer preparation-completion detecting unit 68 detects timings at which various kinds of mounting work (the tape attaching work, the component mounting work, and component compression work) have been completely performed in the respective mounting work units and preparation for transferring the substrates 2 to the downstream side has been completed.

The time measuring unit 69 measures time having passed from attachment of the individual tape 4b1 to the substrate 2 in the tape attaching unit 8 for each substrate 2. In this embodiment, the time measuring unit 69 measures the time from a timing at which the compression tool 19 starts to be raised after the compression tool 19 is lowered to press and attach the individual tape 4b1 to the substrate 2. Alternatively, the timing for start measuring is not limited thereto. For example, the time measuring unit 69 may measure the time from a timing at which the moving stage 12 holding the substrate 2, which has been completely subjected to tape attachment work, is moved to the sixth position P6. That is, the time measuring unit 69 may measure the time from an arbitrary timing after completing the attachment of the individual tape 4b1 in the tape attaching unit 8. When the compression of the component 5 to the substrate 2 is completed, the measurement of time by the time measuring unit 69 is cleared (cancelled).

The forced transfer setting unit 70 sets conditions that are required when the forced transfer of the substrates 2 is performed. The forced transfer means a method of forcibly transferring the uncompressed substrate to the mounting work unit at the downstream side when the compression of the component 5 to the substrate 2 is not completed within a predetermined time after the start of the measurement of time performed by the time measuring unit 69. Conditions to be set include the setting of the presence/absence of forced transfer and time that has passed until forced transfer is performed after the start of the measurement of time. The display-input unit 71 is display-input means such as a touch panel, and displays operation screens or various kinds of information that are necessary for the operation of the component mounting apparatus 1. Further, the display-input unit 70 displays a guide screen that is necessary when conditions of the forced transfer of the substrates 2 are set.

Figure 12:
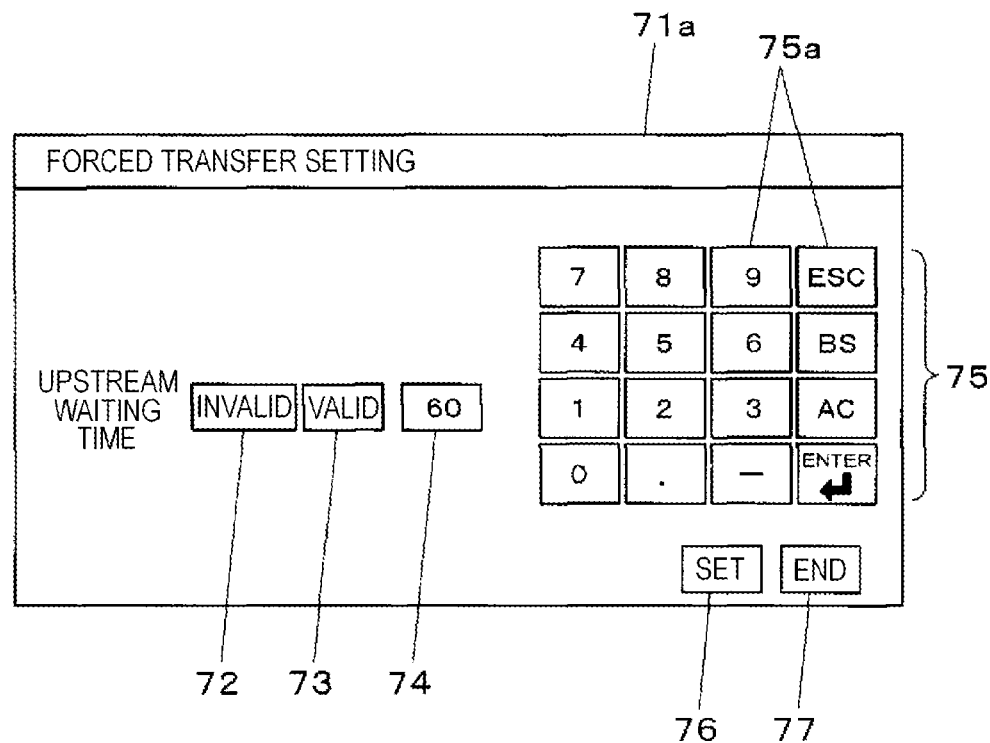
FIG. 12 shows a forced transfer setting screen displayed on a display-input unit that is included in the component mounting apparatus according to the embodiment of the present invention.

Next, a method of setting conditions of the forced transfer will be described with reference to FIG. 12. FIG. 12 shows a guide screen 71a that is displayed on the display-input unit 71 when the forced transfer setting unit 70 starts. Information, which includes "invalid" 72, "valid" 73, a "time input field" 74, and a "keypad" 75, is displayed on the guide screen 71a. The "invalid" 72 is an operation switch that makes the forced transfer invalid, and the "valid" 73 is an operation switch that makes the forced transfer valid.

When the forced transfer is made valid, time, which has passed until forced transfer is performed after the start of the measurement of time performed by the time measuring unit 69, is input to the "time input field" 74. That is, time while the state of the component 5, which is not subjected to compression, of the substrate 2 to which the individual tape 4b1 is attached is allowable (hereinafter, referred to as "allowed time") is input to the "time input field" 74. The allowed time is arbitrarily set according to characteristics of the ACF tape 4b for use by an operator.

The ACF tape 4b will be described here. The ACF tape 4b has adhesion, and functions as a joining material that joins the substrate 2 to the component 5. Further, when the component 5 and the electrode portion of the substrate 2 are thermally compressed to each other with the ACF tape 4b interposed therebetween, only a thermally compressed portion of the ACF tape 4b has conductivity. Accordingly, the ACF tape 4b functions as a conductive member that obtains conduction between the component 5 and the electrode portion of the substrate 2. The ACF tape 4b gradually deteriorates and the above-mentioned adhesion or conductivity is affected under a normal temperature environment in the component mounting apparatus 1 including a state in which the tape feed reels 16 are mounted on the base plates 14. As a result, it is considered that the joining quality of the component 5 is lowered. That is, since the available time of the ACF tape 4b under the normal temperature environment is limited, the compression of the component 5 needs to be quickly performed on the substrate 2, to which the individual tape 4b1 is attached, before the individual tape 4b1 deteriorates.

An operator inputs time (available time), in which it is assumed that the individual tape 4b1 attached to the substrate 2 has constant adhesion, to the "time input field" 74 as the allowed time. For example, when a low-temperature curing ACF tape 4b is used, the available time of the ACF tape 4b under a normal temperature environment is shorter than the available time of a usual ACF tape under a normal temperature environment. Accordingly, the allowed time is set to be short.

The "keypad" 75 functions as an input unit on which a plurality of various input keys 75a used to input an intended numeral to the "time input field" 74 are arranged, and allowed time is input through the "keypad" 75. The setting of the conditions of the forced transfer is performed by operating (clicking) any one of the "invalid" 72 and the "valid" 73 and operating "set" 76 displayed on the screen after intended allowed time is input when the "valid" 73 is selected. "End" 77 is operated to end the guide screen 71a.

Figure 13:
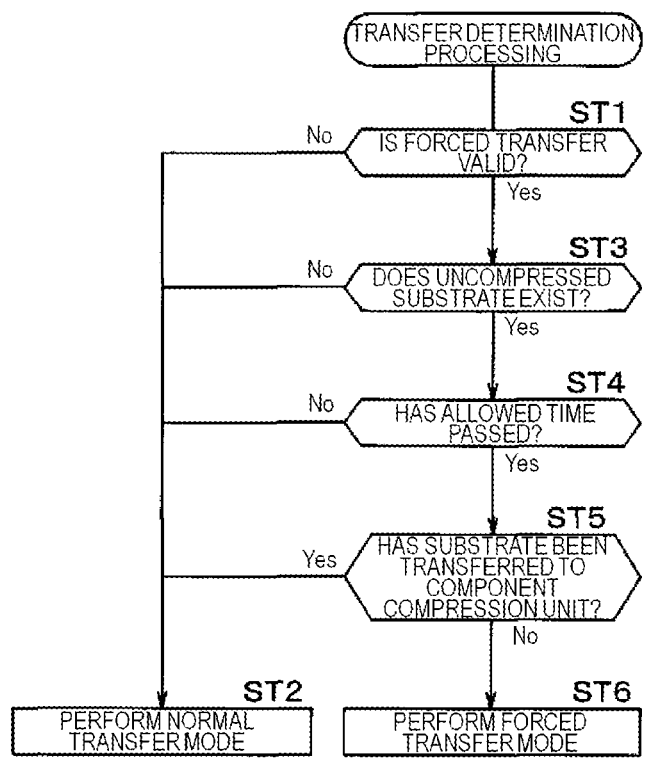
FIG. 13 is a flowchart of transfer determination processing of the embodiment of the present invention.

The component mounting apparatus 1 of the present invention has the above-mentioned structure, and transfer determination processing for the substrates 2 will be described below with reference to a flowchart of FIG. 13. The transfer control unit 66 determines and performs a transfer mode for the substrate 2 according to the result of processing performed here. First, the transfer control unit 66 determines whether or not forced transfer is set to be valid (ST1: a step of determining the setting of forced transfer). If forced transfer is not set to be valid, the transfer control unit 66 transfers the substrates 2 in the "normal transfer mode" (ST2: a step of performing the normal transfer mode). The details of the normal transfer mode will be described later. On the other hand, if force transfer is set to be valid, the transfer control unit 65 determines whether or not one or more uncompressed substrates exist (ST3: a step of determining existence of uncompressed substrate). The determination performed here is performed on the basis of whether or not the substrate 2 as a target of measuring time by the time measuring unit 69 exists.

If the uncompressed substrate exists in (ST3), it is determined or not whether the uncompressed substrate, having a preset allowed time being exceeded (ST4: a step of determining allowed time excess). That is, in this step, the uncompressed substrate, to which the component 5 has not been compressed in the allowed time, is detected. If the uncompressed substrate, having a preset allowed time being exceeded, does not exist, the substrate 2 is transferred in the normal transfer mode (ST2). Steps of (ST3) and (ST2) or (ST3), (ST4), and (ST2) are repeatedly performed under a state in which the transfer of the substrate 2 between the work units is smoothly performed without the delay of the preparation for transferring the substrates 2 in each work unit even though forced transfer is set to be valid.

On the other hand, if the uncompressed substrate, having the preset allowed time being exceeded, does exist in (ST4), it is determined whether or not the uncompressed substrate has been transferred to the component compression unit 35, which is the final mounting work step (ST5: a step of determining transfer to the component compression unit). That is, since it is not necessary to perform the forced transfer when a timing at which the allowed time has passed occurs after the uncompressed substrate is transferred to the component compression unit 35 before the component compression work is performed, the substrate 2 is transferred in the normal transfer mode (ST2). On the other hand, if the uncompressed substrate has not been transferred to the component compression unit 35 in (ST5), that is, if the allowed time has passed at any of the mounting work units located at the upstream side of the component compression unit 35, the transfer control unit 66 forcibly transfers the uncompressed substrate in the "forced transfer mode" (ST6: a step of executing forced transfer mode).

Figure 14:
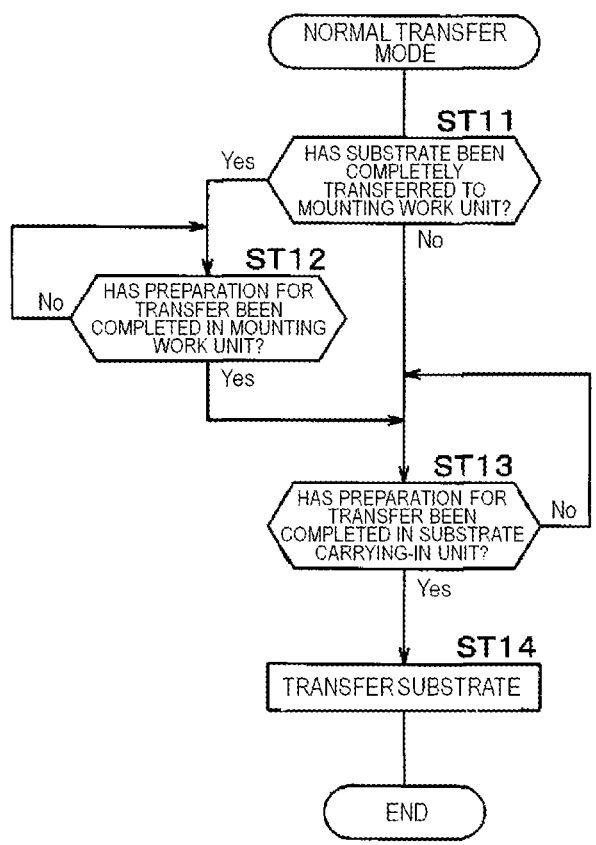
FIG. 14 is a flowchart of a normal transfer mode of the embodiment of the present invention.

Next, substrate transfer processing in the normal transfer mode will be described with reference to a flowchart of FIG. 14. First, the transfer control unit 66 determines whether or not the substrates 2 are transferred to at least any one mounting work unit among the plurality of mounting work units (the tape attaching unit 8, the component mounting unit 21, and the component compression unit 35) (ST11: a step of determining the transfer of the substrate). If the substrates 2 are transferred to any of the mounting work units, it is determined whether or not preparation for transferring the substrates 2 to the downstream side has been completed in the mounting work unit of a transfer destination (ST12: a step of determining the completion of preparation for transfer in the mounting work unit). In this step, the present/absence of transferring the substrates 2 in all of the mounting work units is determined.

If the substrates 2 are not transferred to the mounting work unit in (ST11) or if the preparation for transferring the substrates 2 has been completed in (ST12), the transfer control unit 66 determines whether or not the substrate 2 is carried into the substrate carrying-in unit 6 from the upstream facility and the preparation for transferring the substrate 2 to the tape attaching unit 8 has been completed (ST13: a step of determining the completion of preparation for transfer in the substrate carrying-in unit). If the preparation for transferring the substrates 2 has been completed in the substrate carrying-in unit 6, the substrate 2 is transferred to the downstream side (ST14: a step of transferring the substrate). When there is a plurality of substrates 2, transfer of which has been completed, all the substrates 2 are simultaneously transferred to the downstream side.

Figure 15A:
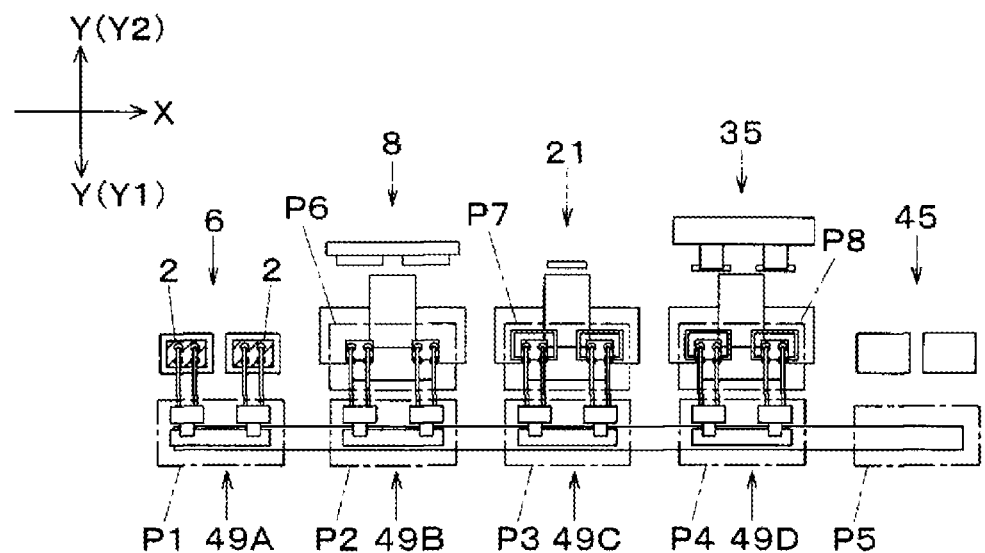
FIGS. 15A, 15B, and 15C illustrate a substrate transfer operation in a normal mode of the embodiment of the present invention.

Next, specific operations for transferring the substrates 2 in the normal transfer mode will be described with reference to FIGS. 15A to 17B. First, when the substrates 2 are carried into the substrate carrying-in unit 6 from the upstream facility and preparation for transferring the substrates 2 to the tape attaching unit 8 has been completed in the substrate carrying-in unit 6 as shown in FIG. 15A, the transfer control unit 66 moves in the X direction the first substrate transfer mechanism 49A to the first position P1, moves the second substrate transfer mechanism 49B to the second position P2, moves the third substrate transfer mechanism 49C to the third position P3, and moves the fourth substrate transfer mechanism 49D to the fourth position P4 in synchronization. Hereinafter, the movement of the substrate transfer mechanisms 49A to 49D is referred to as "upstream-side movement". After that, substrates 2, which have been completely subjected to the preparation for transfer in the substrate carrying-in unit 6, are held by the first substrate transfer mechanism 49A.

Figure 15B:
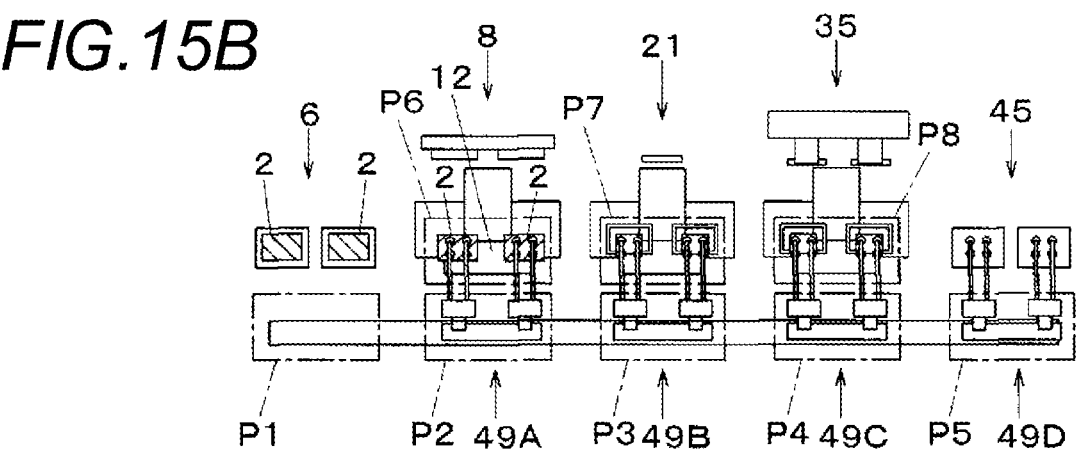

Then, as shown in FIG. 15B, the transfer control unit 65 moves in the X direction the first substrate transfer mechanism 49A to the second position P2, moves the second substrate transfer mechanism 49B to the third position P3, moves the third substrate transfer mechanism 49C to the fourth position P4, and moves the fourth substrate transfer mechanism 49D to the fifth position P5 in synchronization. Hereinafter, the movement of the substrate transfer mechanisms 49A to 49D in the X direction is referred to as "downstream-side movement". After that, the substrates 2, which are held by the first substrate transfer mechanism 49A, are transferred to the moving stage 12 that is moved to the sixth position P6. Then, tape attaching work is performed on the substrates 2 placed on the moving stage 12. While the tape attaching work is performed, substrates 2 are carried into the substrate carrying-in unit 6 anew.

Figure 15C:
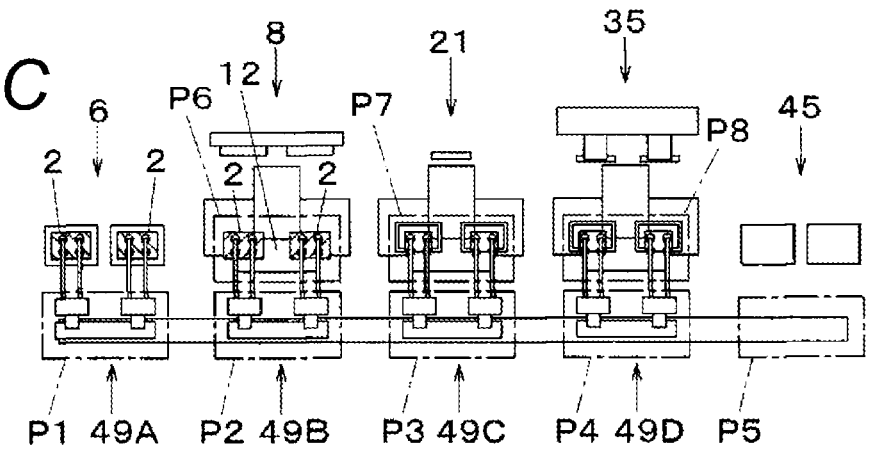

After that, when the substrates 2 are carried into the substrate carrying-in unit 6, the transfer control unit 65 performs the upstream-side movement of the substrate transfer mechanisms 49A to 49D as shown in FIG. 15C. Further, substrates 2, which have been completely subjected to the preparation for transfer in the substrate carrying-in unit 6, are held by the first substrate transfer mechanism 49A and substrates 2 placed on the moving stage 12, which is moved to the sixth position P6 again after the completion of the tape attaching work (which has been completely subjected to the preparation for transfer), are held by the second substrate transfer mechanism 49B.

Figure 16A:
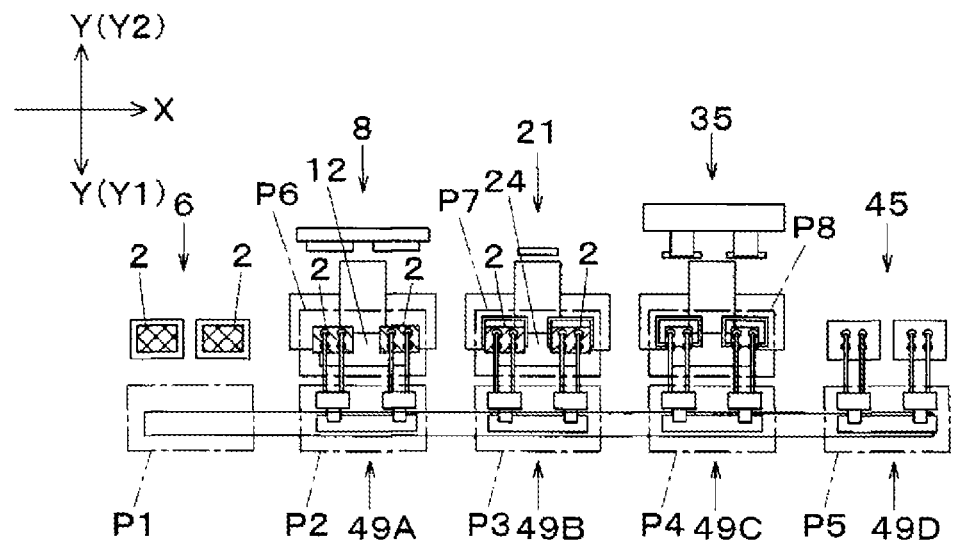
FIGS. 16A, 16B, and 16C illustrate the substrate transfer operation in the normal mode of the embodiment of the present invention.

Next, after performing the downstream-side movement of the substrate transfer mechanisms 49A to 49D as shown in FIG. 16A, the transfer control unit 65 transfers the substrates 2 held by the first substrate transfer mechanism 49A to the moving stage 12 and transfers the substrates 2 held by the second substrate transfer mechanism 49B to the moving stage 24 moved to the seventh position P7. As described above, the second substrate transfer mechanism 49B serves as a first substrate transfer unit that transfers the substrate 2, to which the individual tape 4b1 (adhesive tape) is attached, to the component mounting unit 21 from the tape attaching unit 8.

After that, tape attaching work is performed on the substrates 2 placed on the moving stage 12 and component mounting work is performed on the substrates 2 placed on the moving stage 24. While various kinds of mounting work are performed in the respective mounting work units, substrates 2 are carried into the substrate carrying-in unit 6 anew.

Figure 16B:
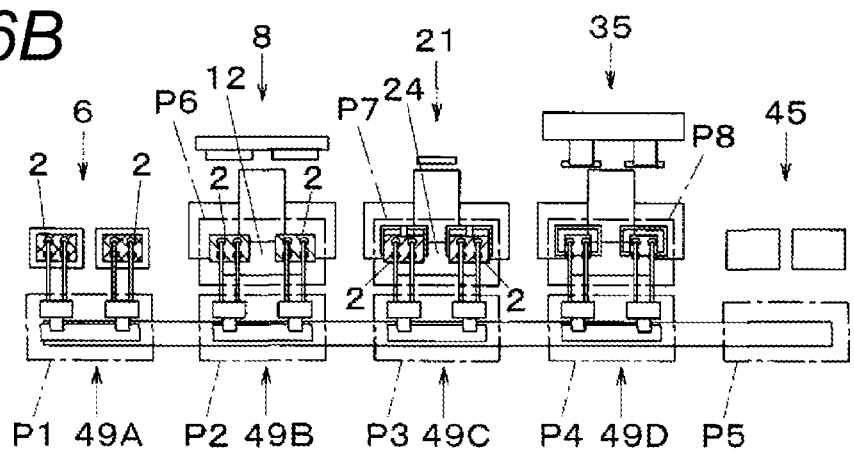

Next, when the substrates 2 are carried into the substrate carrying-in unit 6, the transfer control unit 65 performs the upstream-side movement of the substrate transfer mechanisms 49A to 49D as shown in FIG. 16B. Further, substrates 2, which have been completely subjected to the preparation for transfer in the substrate carrying-in unit 6, are held by the first substrate transfer mechanism 49A and substrates 2, which have been completely subjected to the preparation for transfer in the tape attaching unit 8, are held by the second substrate transfer mechanism 49B. Furthermore, substrates 2 placed on the moving stage 24, which is moved to the seventh position P7 again after the completion of the component mounting work (which has been completely subjected to the preparation for transfer), are held by the third substrate transfer mechanism 49C.

Figure 16C:
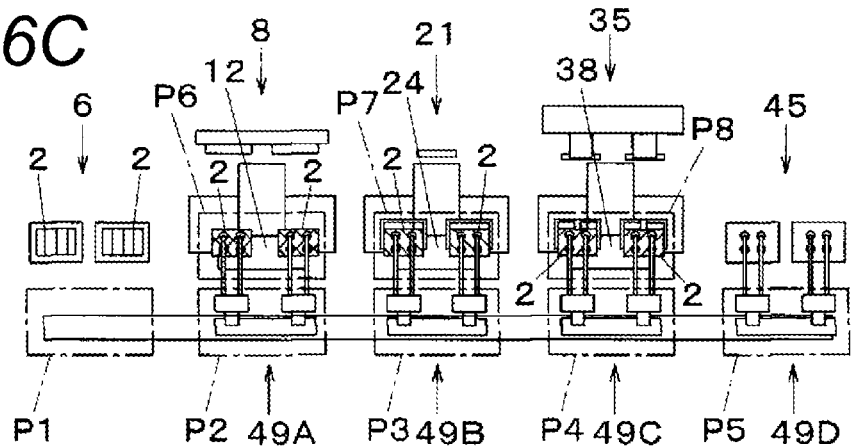

After that, as shown in FIG. 16C, the transfer control unit 65 performs the downstream-side movement of the substrate transfer mechanisms 49A to 49D, transfers the substrates 2 held by the first substrate transfer mechanism 49A to the moving stage 12, and transfers the substrates 2 held by the second substrate transfer mechanism 49B to the moving stage 24. Moreover, the transfer control unit 65 transfers the substrate 2 held by the third substrate transfer mechanism 49C to the moving stage 38 that has moved to the eighth position P8. As described above, the third substrate transfer mechanism 49C serves as a second substrate transfer unit that transfers the substrate 2, on which the component 5 is mounted, to the component compression unit 35 from the component mounting unit 21.

After that, tape attaching work is performed on the substrates 2 placed on the moving stage 12 and component mounting work is performed on the substrates 2 placed on the moving stage 24. Moreover, component compression work is performed on the substrates 2 placed on the moving stage 38. While various kinds of mounting work are performed in the respective mounting work units, substrates 2 are carried into the substrate carrying-in unit 6 anew (FIG. 16C).

Figure 17A:
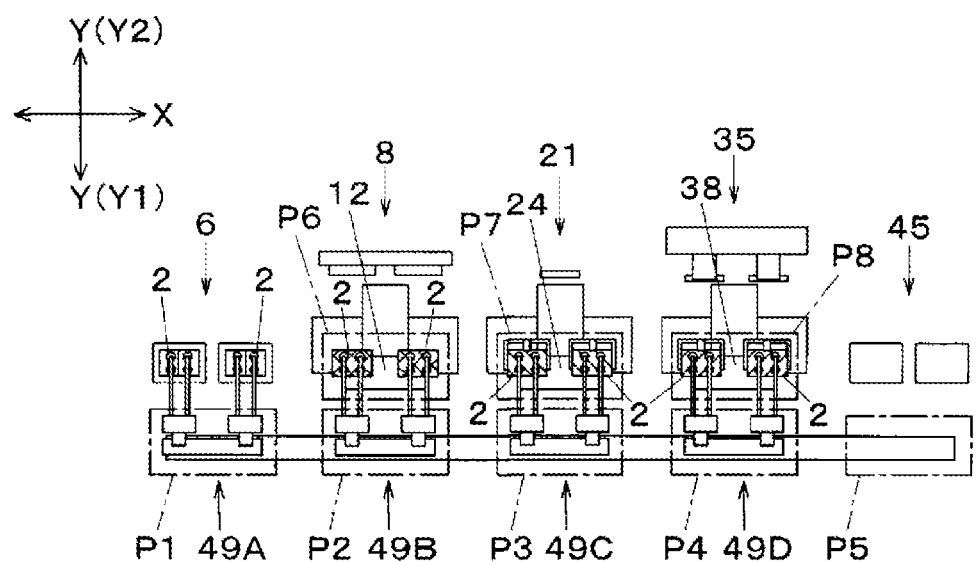
FIGS. 17A and 17B illustrate the substrate transfer operation in the normal mode of the embodiment of the present invention.

Next, when the substrates 2 are carried into the substrate carrying-in unit 6, the transfer control unit 65 performs the upstream-side movement of the substrate transfer mechanisms 49A to 49D as shown in FIG. 17A. After that, substrates 2, which have been completely subjected to the preparation for transfer in the substrate carrying-in unit 6, are held by the first substrate transfer mechanism 49A and substrates 2, which have been completely subjected to the preparation for transfer in the tape attaching unit 8, are held by the second substrate transfer mechanism 49B. Furthermore, substrates 2, which have been completely subjected to the preparation for transfer in the component mounting unit 21, are held by the third substrate transfer mechanism 49C and substrates 2, which are moved to the eighth position P8 again after the completion of the component compression work (which has been completely subjected to the preparation for transfer), are held by the fourth substrate transfer mechanism 49D.

Figure 17B:
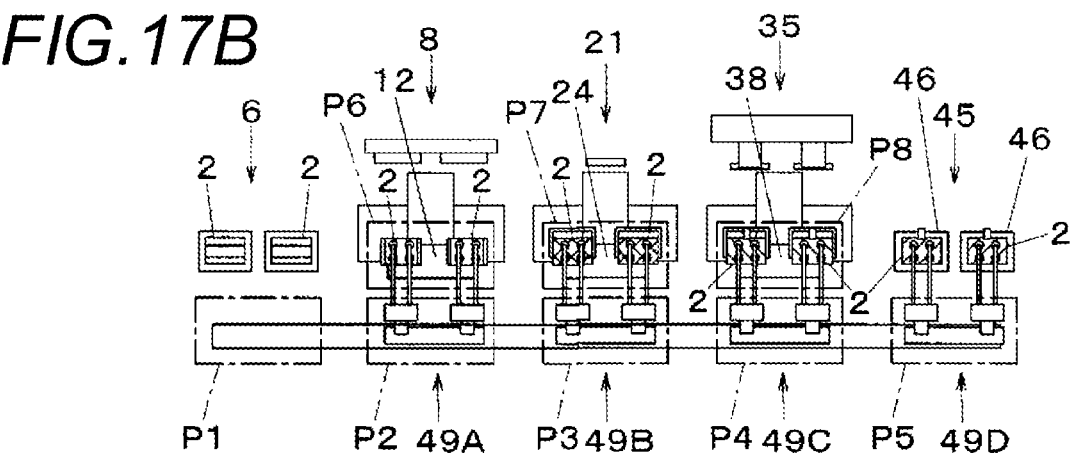

Then, the transfer control unit 65 performs the downstream-side movement of the substrate transfer mechanisms 49A to 49D as shown in FIG. 17B. Further, the transfer control unit 65 transfers the substrates 2 held by the first substrate transfer mechanism 49A to the moving stage 12 and transfers the substrates 2 held by the second substrate transfer mechanism 49B to the moving stage 24. Furthermore, the transfer control unit 65 transfers the substrates 2 held by the third substrate transfer mechanism 49C to the moving stage 38 and transfers the substrates 2 held by the fourth substrate transfer mechanism 49D to the substrate holding tables 46 of the substrate carrying-out unit 45. The substrates 2, which are transferred to the substrate carrying-out unit 45, are carried to the downstream facility at the same timing as a timing at which the substrates 2 are transferred between the work units or at a timing before the timing. As described above, the fourth substrate transfer mechanism 49D serves as a third substrate transfer unit that transfers the substrate 2, on which the component 5 is mounted and compressed, to the substrate carrying-out unit 45 from the component compression unit 35.

In the above-mentioned normal transfer mode, the transfer of the substrates 2 between the working units are simultaneously performed when the transfer of the substrates 2 in the substrate carrying-in unit 6 in addition to the tape attaching unit 8, the component mounting unit 21 and the component compression unit 35 has been completed. Accordingly, since the substrates 2 are efficiently transferred between the work units, it is possible to improve work tact.

Figure 18:
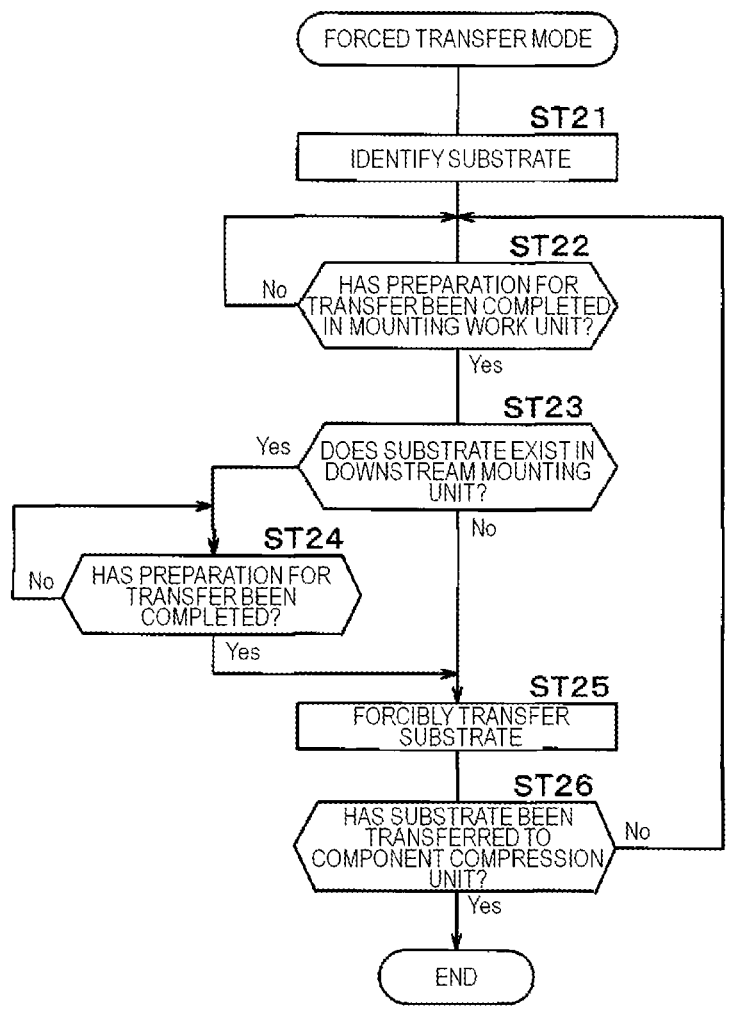
FIG. 18 is a flowchart of a forced transfer mode of the embodiment of the present invention.

Next, substrate transfer processing in the forced transfer mode will be described with reference to a flowchart of FIG. 18. The transfer control unit 66 memorizes the uncompressed substrate, which is determined to have allowed time passed in (ST4) of FIG. 13 as explained beforehand, and identifies the uncompressed substrate as a forced transfer target (ST21: a step of identifying a forced transfer substrate). Subsequently, the transfer control unit 66 determines whether the mounting work is performed at the mounting work unit by which the identified uncompressed substrate is transferred, and the preparation for transfer to the downstream side has been completed (ST22: a step of determining whether the preparation for transfer has been completed).

If the preparation for transfer is completed, it is determined whether or not the substrate 2 is transferred to the mounting work unit at the downstream side of the mounting work unit which is the transfer destination of the uncompressed substrate (ST23: a step of determining presence/absence of substrate in the mounting work unit at the downstream side). If the substrate 2 is transferred, it is determined whether the mounting work is performed at the mounting work unit of the transfer destination, and the preparation for transfer to the downstream side is completed (ST24: a step of determining whether the preparation for transfer in the mounting work unit at the downstream side is completed). This step secures the performance of the mounting work with respect to the substrate 2 which is transferred to the mounting work unit at the downstream side of the uncompressed substrate, which is identified as a forced transfer target.

If the substrate 2 is not transferred in the mounting work unit at the downstream side in (ST23), or the preparation for transfer of the substrate 2 in the mounting work unit at the downstream side is completed in (ST24), the uncompressed substrate is transferred to the downstream side. The transfer mode corresponds to the forced transfer (ST25: a step of forcibly transfer substrate). Namely, the forced transfer indicates a transfer mode of transferring the uncompressed substrate to the mounting work unit at the downstream side irrespective of the working state in the work unit at the upstream side of the work unit, by which the uncompressed substrate identified as the forced transfer target is transferred. When there is a substrate 2, of which the preparation for transfer is completed in the mounting work unit, at the downstream side of the mounting work unit by which the uncompressed substrate is transferred, the substrate 2 is also transferred (forcibly transferred) to the downstream side together with the uncompressed substrate.

If the forced transfer is executed in (ST25), it is determined whether the forced transfer destination of the uncompressed substrate is the component compression unit 35 of the final component work step (ST26: a step of determining transfer to the component compression unit). If the forced transfer destination is the component compression unit 35, the forced transfer mode is terminated. Subsequently, the component compression work is performed on the uncompressed substrate. That is, the component 5 is compressed to the uncompressed substrate (the substrate 2) which is forcibly transferred before the individual tape 4b1 attached thereto is deteriorated. After the component is compressed, the time measuring by the time measuring unit 69 is cleared. On the other hand, if the forced transfer destination is not the component compression unit 35, the procedure returns back to (ST22).

Figure 19A:
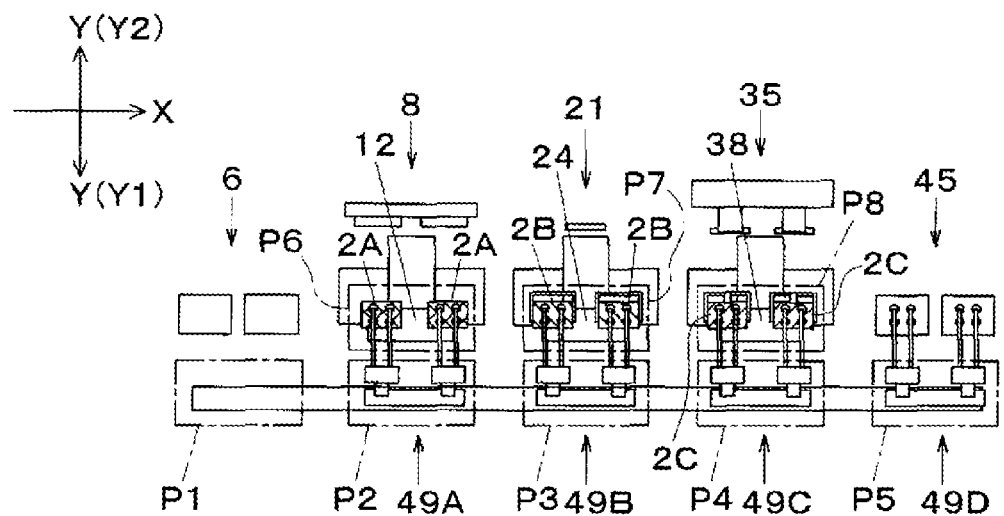
FIGS. 19A, 19B, and 19C illustrate a substrate transfer operation in the forced transfer mode of the embodiment of the present invention.
Figure 19B:
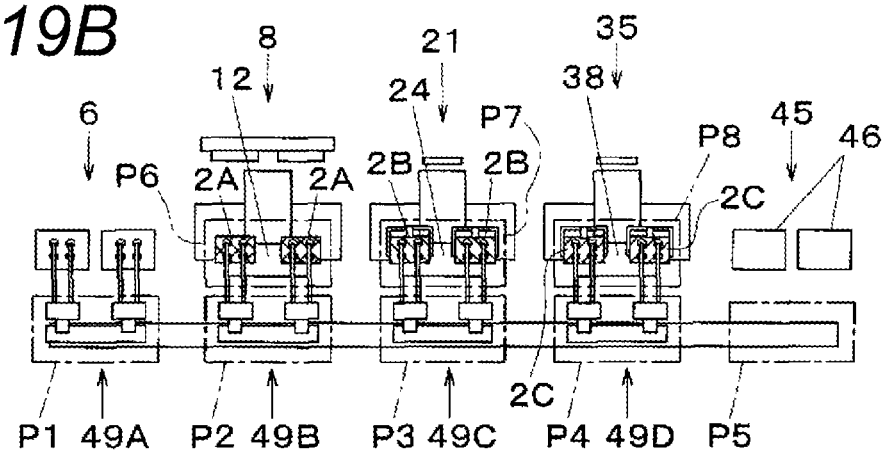
Figure 19C:
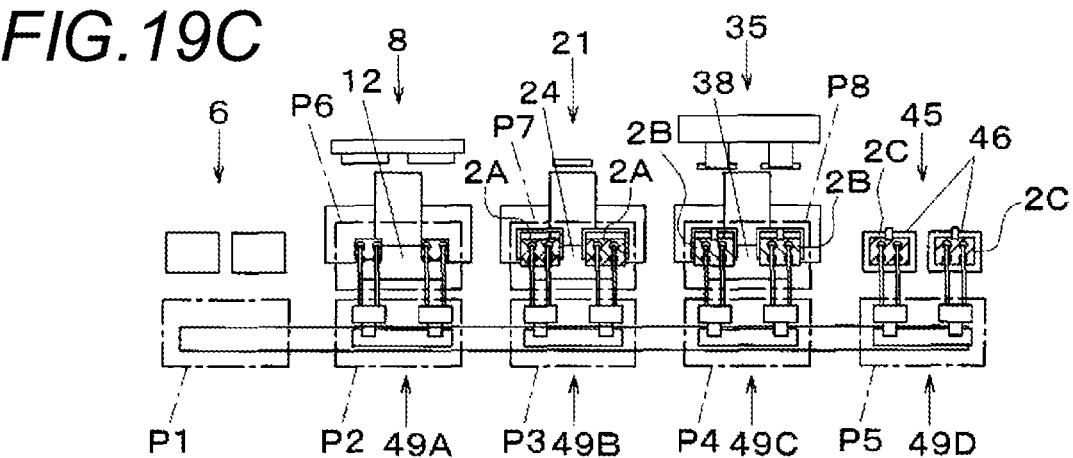

Next, an example of the forced transfer operation is described with reference to FIGS. 19A to 19C. FIG. 19A illustrates a state where substrates 2A, 2B, 2C have been transferred to the tape attaching unit 8, the component mounting unit 21 and the component compression unit 35, respectively, but the carrying-in of the substrate 2 to the substrate carrying-in unit 6 is delayed and the preparation for transfer is not completed. In this state, when the substrate 2B transferred to the component mounting unit 21 has passed the allowed time, the upstream-side movement of the substrate transfer mechanisms 49A to 49D is performed, as shown in FIG. 19B.

Subsequently, the substrate 2B is held by the third substrate transfer mechanism 49C, and the substrate 2C is held by the fourth substrate transfer mechanism 49D. In this case, when the preparation for transfer of the substrate 2A is completed, the substrate 2A is held by the second substrate transfer mechanism 49B. Subsequently, as shown in FIG. 19C, after the downstream-side movement of the substrate transfer mechanisms 49A to 49D is performed, the substrate 2B is loaded on the moving stage 38 and the substrate 2C is loaded on the substrate holding table 46 of the substrate carrying-out unit 45. In this way, the substrate 2B is forcibly transferred to the component compression unit 35, and then, the component compression work is performed on the substrate 2A. Accordingly, it is possible to quickly compress the component 5 to the substrate 2B, the allowed time of which has passed. As a result, it is possible to suppress the deterioration of the adhesive tape 4b (the individual tape 4b1), and suppress the occurrence of the mount-fault substrate due to the quality deterioration of bonding.

In addition, when the transfer of the substrate 2A is performed by the second substrate transfer mechanism 49B, the substrate 2A is loaded on the moving stage 24. That is, in the step of forced transfer of (ST25), when there are substrates 2, the preparation for transfer of which is completed, in the work unit at the upstream side of the mounting work unit by which the uncompressed substrate identified as the forced transfer target is transferred, the substrates 2 are simultaneously transferred (forcibly transferred) to the downstream side. In this way, it is possible to quickly perform the component compression work on the substrate 2A, and compress the component 5 on the substrate 2A while suppressing the deterioration of the adhesive tape 4b (the individual tape 4b1) attached to the substrate 2A.

As described above, in the forced transfer mode, the substrates 2, which have been completely subjected to the preparation for transfer in the mounting work unit, are transferred in consideration with only the work state in the mounting work unit at the downstream side of the mounting work unit, by which the substrate 2 identified as the forced transfer target is transferred. The forced transfer mode continues to be performed until the identified substrate 2 is transferred to the component compression unit 35. That is, when a predetermined time (allowed time) has passed from the start of measuring by the time measuring unit 69, the substrate 2 as a measuring target, to which the individual tape 4b1 is attached, is forcibly transferred to the downstream side, and then the component 5 is compressed in the component compression unit 35. Accordingly, even when the preparation for transferring the substrates 2 is delayed in the work unit present on the upstream side of the tape attaching unit 8, it is possible to suppress the generation of substrates having mounting defects, which are caused by the deterioration of joining quality, by transferring the substrates, to which the individual tapes 4b1 have been attached and which are not subjected to compression, to the downstream side ahead of time and further performing the compression of the components 5.

Further, it is possible to establish both the improvement of work tact and the prevention of the generation of a substrate, which has a mounting defect, by transferring the substrates 2 while selectively using the normal transfer mode and the forced transfer mode. Furthermore, considering the characteristics, for example, adhesion of the ACF tape 4b to be used, an operator arbitrarily sets allowed time, which has passed until the compression of the component 5 is performed after the individual tape 4b1 is attached to the substrate 2, according to time where it is considered that the ACF tape has constant adhesion under a normal temperature environment. Accordingly, it is possible to compress the component 5 while suppressing the deterioration of the individual tape 4b1 that is attached to the forcibly transferred substrate 2.

The predetermined time (the allowed time) for starting the forced transfer mode may be set depending on the position of the uncompressed substrate. That is, a first allowed time is set for the uncompressed substrate remaining in the tape attaching unit 8, and a second allowed time is set for the uncompressed substrate remaining in the component mounting unit 21 to forcibly transfer the uncompressed substrates by the second substrate transfer mechanism 49B and the third substrate transfer mechanism 49C to their downstream sides, respectively. In this case, the first allowed time is shorter than the second allowed time.

The present invention is not limited to the embodiment having described above. For example, the number of the substrate holding tables of each work unit may be arbitrary. Further, the number of the mounting work units may also be arbitrary and a plurality of the same type of mounting work units may installed.

The present invention is particularly useful in the field of electronic component mounting in which a component can be compressed with the suppression of the deterioration of an adhesive tape and a component is mounted on a substrate with an adhesive tape interposed therebetween.

What is claimed is:

1. A component mounting apparatus comprising:
   a tape attaching unit that attaches an adhesive tape to a substrate;
   a component mounting unit that is provided on a downstream side of the tape attaching unit and mounts a component on the adhesive tape attached to the substrate;
   a component compression unit that is provided on a downstream side of the component mounting unit and compresses the component, which is mounted on the substrate, to the substrate with the adhesive tape interposed therebetween;
   a first substrate transfer unit that transfers the substrate, to which the adhesive tape is attached, to the component mounting unit from the tape attaching unit;
   a second substrate transfer unit that transfers the substrate, on which the component is mounted, to the component compression unit from the component mounting unit;
   a time measuring unit that measures time having passed after attachment of the adhesive tape in the tape attaching unit; and
   a forced transfer setting unit that includes activation of forced transfer of the substrate, wherein
   in a case where the forced transfer of the substrate is being activated in the forced transfer setting unit, when a predetermined time has passed after the start of measurement performed by the time measuring unit, the substrate, to which the adhesive tape of a measuring target is attached, is forcibly transferred to the downstream side, and the component compression unit compresses the component to the substrate forcibly transferred to the component compression unit.

2. The component mounting apparatus according to claim 1, wherein
   the component compression unit compresses the component before deterioration of the adhesive tape attached to the substrate forcibly transferred to the downstream side from the tape attaching unit.

3. The component mounting apparatus according to claim 1, wherein
   the predetermined time includes a first allowed time being set for a first substrate remaining in the tape attaching unit, and a second allowed time being set for a second substrate remaining in the component mounting unit to forcibly transfer the first and second substrates by the first and second substrate transfer units to their downstream sides, respectively, wherein the first allowed time is shorter than the second allowed time.

* * * * *